United States Patent
Davis et al.

(10) Patent No.: US 12,539,644 B2
(45) Date of Patent: Feb. 3, 2026

(54) METHOD AND APPARATUS FOR PROVIDING REAL TIME AIR MEASUREMENT APPLICATIONS IN WET CONCRETE

(71) Applicant: CIDRA CORPORATE SERVICES INC., Wallingford, CT (US)

(72) Inventors: Michael A. Davis, Glastonbury, CT (US); Douglas H. Loose, Southington, CT (US); Charles Winston, Glastonbury, CT (US); David Bellmore, Glastonbury, CT (US); Mark A. Foss, Glastonbury, CT (US); John Biesak, Durham, CT (US); Stephen Fiondella, North Haven, CT (US); David Vincent Newton, Madison, CT (US)

(73) Assignee: CIDRA CORPORATE SERVICES INC., Wallingford, CT (US)

( * ) Notice: Subject to any disclaimer, the term of this patent is extended or adjusted under 35 U.S.C. 154(b) by 369 days.

(21) Appl. No.: 16/638,209

(22) PCT Filed: Aug. 22, 2018

(86) PCT No.: PCT/US2018/047522
§ 371 (c)(1),
(2) Date: Feb. 11, 2020

(87) PCT Pub. No.: WO2019/040621
PCT Pub. Date: Feb. 28, 2019

(65) Prior Publication Data
US 2020/0171704 A1    Jun. 4, 2020

Related U.S. Application Data

(60) Provisional application No. 62/548,736, filed on Aug. 22, 2017, provisional application No. 62/548,760, (Continued)

(51) Int. Cl.
*B28C 5/42* (2006.01)
*B28C 7/02* (2006.01)
(Continued)

(52) U.S. Cl.
CPC .............. *B28C 5/422* (2013.01); *B28C 7/024* (2013.01); *G01N 29/024* (2013.01);
(Continued)

(58) Field of Classification Search
CPC .. H04Q 9/00; H04Q 2209/00; H04Q 2209/10; H04Q 2209/40; H04Q 2209/43;
(Continued)

(56) References Cited

U.S. PATENT DOCUMENTS 4,429,575 A    2/1984  Akishika
4,688,578 A    8/1987  Takano et al.
(Continued)

FOREIGN PATENT DOCUMENTS

CN    106272973 A    1/2017
DE    3210173        9/1983
(Continued)

OTHER PUBLICATIONS

JP2017087443 English Language Abstract (1 page).
(Continued)

*Primary Examiner* — Franklin D Balseca
(74) *Attorney, Agent, or Firm* — William J. Barber; Ware Fressola; MAGUIRE & BARBER LLP

(57) ABSTRACT

A system features a combination of an acoustic sensor and a communication transmitter. The acoustic sensor is arranged on a rotating container or drum having a slurry contained therein, including concrete, and configured to provide an acoustic signal to sense an acoustic signal containing information about a characteristic of the slurry, and provide acoustic sensor signaling containing informa-
(Continued)

A system 30:

An acoustic sensor 100 arranged on a rotating container and drum having a slurry contained therein, including concrete, and configured to provide an acoustic signal to sense an acoustic signal containing information about a characteristic of the slurry, and provide acoustic sensor signaling containing information about the acoustic signal sensed.

A power system 32 arranged on the rotating container or drum, and configured to receive a power signal, and provide a power control signal to the acoustic sensor to activate and power the acoustic sensor to make a full air measurement to sense the characteristic of the slurry, and de-activate the acoustic sensor and remove the power after making the full air measurement.

tion about the acoustic signal sensed. The communication transmitter is arranged on the rotating container or drum, and configured to receive the acoustic signal, and provide the acoustic signal received from the rotating container or drum for further processing.

12 Claims, 18 Drawing Sheets

Related U.S. Application Data filed on Aug. 22, 2017, provisional application No. 62/548,766, filed on Aug. 22, 2017, provisional application No. 62/548,775, filed on Aug. 22, 2017.

(51) Int. Cl.
| | |
|---|---|
| G01N 29/024 | (2006.01) |
| G01N 29/032 | (2006.01) |
| G01N 33/38 | (2006.01) |
| G08C 23/04 | (2006.01) |
| H04W 4/80 | (2018.01) |

(52) U.S. Cl.
CPC ......... *G01N 29/032* (2013.01); *G01N 33/383* (2013.01); *G08C 23/04* (2013.01); *H04W 4/80* (2018.02); *H04Q 2209/00* (2013.01); *H04Q 2209/40* (2013.01); *H04Q 2209/43* (2013.01); *H04Q 2209/883* (2013.01)

(58) Field of Classification Search
CPC ........... H04Q 2209/80; H04Q 2209/82; H04Q 2209/826; H04Q 2209/84; H04Q 2209/883; H04W 4/80; B28C 5/422; B28C 7/024; G01N 29/024; G01N 29/032; G01N 33/383; G08C 23/04
See application file for complete search history.

(56) References Cited

U.S. PATENT DOCUMENTS

| | | | |
|---|---|---|---|
| 4,730,493 A | 3/1988 | Lebaud | |
| 4,934,176 A | 6/1990 | Rose | |
| 4,943,930 A | 7/1990 | Radjy | |
| 5,082,371 A | 1/1992 | Ansari | |
| 5,313,405 A | 5/1994 | Jiles et al. | |
| 5,577,026 A * | 11/1996 | Gordon | H04L 25/0266 370/278 |
| 5,650,061 A | 7/1997 | Kuhr et al. | |
| 5,883,569 A | 3/1999 | Kolefas | |
| 5,924,499 A | 7/1999 | Birchak et al. | |
| 6,330,383 B1 | 12/2001 | Cai et al. | |
| 6,644,119 B1 | 11/2003 | Sinha | |
| 6,724,319 B1 | 4/2004 | Knaack et al. | |
| 7,076,227 B1 | 7/2006 | Smith | |
| 7,134,320 B2 | 11/2006 | Gysling et al. | |
| 7,165,464 B2 | 1/2007 | Gysling et al. | |
| 7,343,820 B2 | 3/2008 | Gysling et al. | |
| 7,363,800 B2 | 4/2008 | Gysling et al. | |
| 7,367,240 B2 | 5/2008 | Gysling et al. | |
| 7,426,852 B1 | 9/2008 | Rothman | |
| 7,596,987 B2 | 10/2009 | Gysling | |
| 7,996,160 B2 | 8/2011 | Mcanally | |
| 8,820,147 B2 | 9/2014 | Sinha | |
| 9,506,905 B2 | 11/2016 | Ley | |
| 9,518,870 B2 * | 12/2016 | Verdino | G01K 1/024 |
| 9,711,038 B1 * | 7/2017 | Pennebaker, III | G01F 23/18 |
| 10,126,288 B2 * | 11/2018 | Radjy | G01N 33/383 |
| 10,359,746 B2 * | 7/2019 | Slupik | H04W 4/33 |
| 10,573,165 B2 * | 2/2020 | Schwarzkopf | G06Q 50/08 |
| 2002/0032517 A1 | 3/2002 | Buckelew et al. | |
| 2002/0041047 A1 * | 4/2002 | Josephy | C23C 14/024 427/255.6 |
| 2003/0016762 A1 | 1/2003 | Martin et al. | |
| 2005/0061060 A1 | 3/2005 | Gysling et al. | |
| 2006/0243487 A1 | 11/2006 | Turner et al. | |
| 2007/0017297 A1 | 1/2007 | Georgeson et al. | |
| 2007/0179653 A1 | 8/2007 | Trost et al. | |
| 2008/0208483 A1 | 8/2008 | Loose et al. | |
| 2009/0078519 A1 | 3/2009 | Carcaterra et al. | |
| 2010/0271191 A1 * | 10/2010 | de Graff | B60C 23/0493 73/146 |
| 2013/0192351 A1 * | 8/2013 | Fernald | G01N 29/262 73/61.49 |
| 2014/0297204 A1 * | 10/2014 | Biesak | G01N 29/42 702/56 |
| 2015/0059442 A1 | 3/2015 | Liljenberg | |
| 2015/0078417 A1 | 3/2015 | Verdino | |
| 2015/0082862 A1 | 3/2015 | Loose | |
| 2015/0142362 A1 * | 5/2015 | Jordan | B28C 5/422 702/96 |
| 2015/0212061 A1 | 7/2015 | Radjy | |
| 2017/0217047 A1 * | 8/2017 | Leon | B28C 5/4231 |

FOREIGN PATENT DOCUMENTS

| | | | |
|---|---|---|---|
| DE | 19511585 B4 | 7/2010 | |
| EP | 00493946 | 12/1991 | |
| GB | 2116806 | 9/1983 | |
| JP | 1983169057 | 10/1983 | |
| JP | 1992043961 | 6/1992 | |
| JP | 1997257769 | 10/1997 | |
| JP | 2000241295 | 9/2000 | |
| JP | 2001337074 | 12/2001 | |
| JP | 2005201676 | 7/2005 | |
| JP | 2008049499 A | 3/2008 | |
| JP | 2008302646 | 6/2008 | |
| JP | 2013025663 A * | 2/2013 | ............ G08C 15/00 |
| JP | 2017087443 A | 5/2017 | |
| JP | 2018202716 A | 12/2018 | |
| WO | 2002006024 A1 | 1/2002 | |
| WO | 2011109769 | 9/2011 | |
| WO | 2011119335 | 9/2011 | |
| WO | 2014043709 A1 | 3/2014 | |
| WO | 2018007396 A1 | 1/2018 | |

OTHER PUBLICATIONS

DE19511585 English Language Abstract (1 page).
CN106272973 English Language Abstract (1 page).
JP2008049499 English Language Abstract (1 page).
Stencel J M et al: "Automated foam index test: Quantifying air entraining agent addition and interactions with fly ash-cement admixtures", Cement and Concrete Research, Pergamon Press, Elmsford, NY, US, vol. 39, No. 4, Apr. 1, 2009 (Apr. 1, 2009), pp. 362-370, XP026272859, ISSN: 0008-8846, DOI: 10.10161J. CEMCONRES.2009.01.010 [retrieved on Feb. 20, 2009].
English-language abstract and machine translation of JP2001337074, a publication date Dec. 7, 2001.
English-language abstract and machine translation of JP1997257769, a publication date Oct. 3, 1997.
English-language abstract and machine translation of JP2005201676, a publication date Jul. 28, 2005.
English-language abstract and machine translation of JP1992043961, a publication date Jun. 11, 1992.
English-language abstract and machine translation of JP2008302646 a publication date Jun. 11, 2008.
English language Abstract of JP2018202716A.
"Slip Ring", Wikipedia, Nov. 24, 2016 (Nov. 24, 2016); https://en.wikipedia.org/w/index.php?title=Slip_ring&oldid=751310937 accessed online on Feb. 8, 2024 (whole document).

* cited by examiner

Apparatus 10:

Signal processor 10a configured to receive signaling containing information about an acoustic signal injected into a mixture off concrete;

determine a measurement of air percentage in the mixture of concrete based at least partly on a dual frequency technique that depends on a relationship between the acoustic signal injected and the signaling received, including either by mixing a reference signal injected with detected signaling using a phase sensitive lock-in approach, or by correlating the acoustic signal injected and the signaling received; and/or provide corresponding signaling containing information about the measurement of air percentage in the mixture of concrete, e.g., that may be used to control the amount of air in the mixture of concrete by causing the addition or subtraction of some other material or substance to modify air percentage in the mixture of concrete Other signal processing modules 10b for implementing the signal processing functionality according to the present invention, including memory for storing a computer program code, input/output modules, and data and control busing architecture for coupling all the signal processing component together

FIG. 4

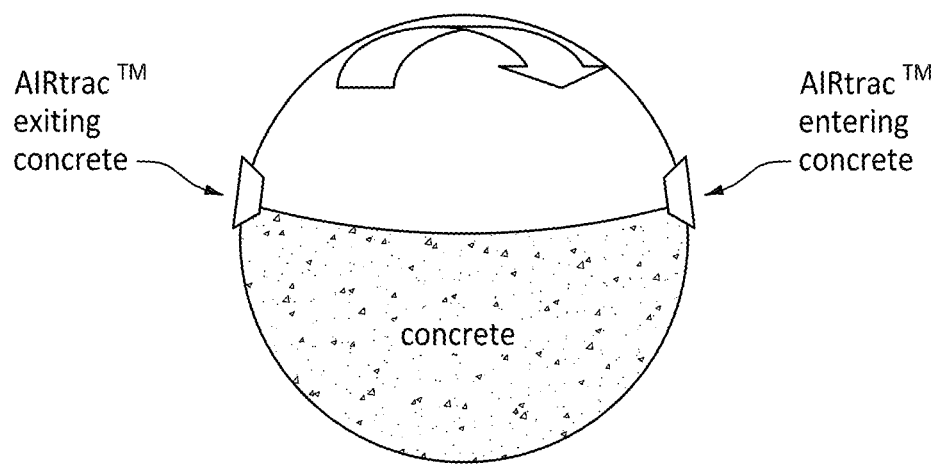
*FIG. 10*: End cross-section of concrete truck drum

A system 20:

An acoustic sensor 100 arranged on a rotating container and drum having a slurry contained therein, including concrete, and configured to provide an acoustic signal to sense an acoustic signal containing information about a characteristic of the slurry, and provide acoustic sensor signaling containing information about the acoustic signal sensed.

A communication transmitter 22 arranged on the rotating container or drum, and configured to receive the acoustic signal, and provide the acoustic signal received from the rotating container or drum for further processing.

*FIG. 11*: The System

A system 30:

An acoustic sensor 100 arranged on a rotating container and drum having a slurry contained therein, including concrete, and configured to provide an acoustic signal to sense an acoustic signal containing information about a characteristic of the slurry, and provide acoustic sensor signaling containing information about the acoustic signal sensed.

A power system 32 arranged on the rotating container or drum, and configured to receive a power signal, and provide a power control signal to the acoustic sensor to activate and power the acoustic sensor to make a full air measurement to sense the characteristic of the slurry, and de-activate the acoustic sensor and remove the power after making the full air measurement.

FIG. 12

METHOD AND APPARATUS FOR PROVIDING REAL TIME AIR MEASUREMENT APPLICATIONS IN WET CONCRETE

CROSS-REFERENCE TO RELATED APPLICATIONS

The application corresponds to PCT/USW2018/047522, filed 22 Aug. 2018, which claims benefit to provisional patent application Ser. Nos. 62/548,736, 62/548,760, 62/548,766, 62/548,755, all filed 22 Aug. 2017 (WFVA/CiDRA file nos. 712-2.455 thru 458); which are all incorporated by reference in their entirety.

This application is related to patent application Ser. No. 14/350,711 (712-2.365-1-1, filed 9 Apr. 2014, which corresponds to PCT/US2012/060822, filed 18 Oct. 2012, which claims benefit to provisional patent application Ser. No. 61/548,549, filed 18 Oct. 2011 (WFVA/CiDRA file nos. 712-2.365/75); and Ser. no. 61/548,563, filed 18 Oct. 2011 (WFVA/CiDRA file nos. 712-2.366/67), which are all incorporated by reference in their entirety.

This application is also related to U.S. patent application Ser. No. 13/583,062, filed 12 Sep. 2012 (WFVA/CiDRA file nos. 712-2.338-1/CCS-0033, 35,40, and 45-49), which is a national stage application corresponding to PCT/US1127731, which are both incorporated in their entirety by reference, and assigned to the assignee of the present application.

BACKGROUND OF THE INVENTION

1. Field of Invention The present invention relates to a technique for real time air measurement in wet concrete; more particularly related to a technique for real time air measurement in wet concrete in order to control the amount of air in a mixture of concrete.

2. Description of Related Art In the prior art, the use of a method for the determination of the flow rate of the medium through a measurement of the velocity of convecting vortical pressure instabilities, and the composition of a two-phase flow through the determination of the speed of sound of the medium, are known. As the composition of the flow varies between the two extremes of 100% of one fluid to 100% of the other, the speed of sound varies in a deterministic way between the values of sound speed in the two respective materials. In the known techniques, the determination of the speed of sound was made using 'passive' listening of the sound propagating in the flow stream.

In the prior art, a number of techniques have been developed that rely on measuring the speed of sound through a material flowing through a pipe. These techniques include using a known SONAR-based GVF meter, density meter and potential mass fraction meter. In these techniques, a passive array-based sensor system is used to detect the presence and speed of acoustics traveling through the materials contained within a pipe. These materials can range from single phase homogeneous fluids to two or three phase mixtures of gases, liquids and solids. Since the measurements system is passive it relies on acoustics produced externally for the measurement. These acoustics can often times come from other equipment in or attached to the pipe such as pumps or valves.

Moreover, in these known techniques many times chemical additives may be added, including to a known flotation process in mineral processing to aid in the separation of the ore. The chemicals, known as frothers, control the efficiency of the flotation process by enhancing the properties of the air bubbles. An important parameter in flotation optimization is the gas volume fraction within a flotation cell. U.S. Pat. No. 7,426,852 B1, which is hereby incorporated by reference in its entirety, discloses approaches to make this measurement, and discloses a technique whereby the speed of sound in the aerated fluid is locally measured using a waveguide (pipe) in conjunction with a SONAR-based array. From the speed of sound measurement, the gas volume fraction can be calculated.

By way of example, see other techniques related to the use of such SONAR-based technology disclosed, e.g., in whole or in part in U.S. Pat. Nos. 7,165,464; 7,134,320; 7,363,800; 7,367,240; and 7,343,820, all of which are incorporated by reference in their entirety.

Moreover, air is a very important component of many materials, such as viscous liquids, slurries or solids, and mixtures of concrete. In particular, air is a critical ingredient when making concrete because it greatly improves the cured product damage resistance to freeze/thaw cycles. Chemical admixtures are typically added during mixing to create, entrain and stabilize billions of small air bubbles within the concrete. However, the entrained air in concrete has the disadvantage of reducing strength so there is always a trade-off to determine the right amount of air for a particular application. In order to optimize certain properties of concrete, it is important to control the entrained air present in the wet (pre-cured) concrete. Current methods for measuring the entrained air can sometimes be slow and cumbersome and additionally can be prone to errors. Moreover, the durability of concrete may be enhanced by entraining air in the fresh mix. This is typically accomplished through the addition of chemical admixes. The amount of admix is usually determined through empirical data by which a "recipe" is determined. Too little entrained air reduces the durability of the concrete and too much entrained air decreases the strength. Typically the nominal range of entrained air is about 5-8% by volume, and can be between 4% and 6% entrained air by volume in many applications. After being mixed in the mixer box, the concrete is then released to the truck. The level of entrained air is then measured upon delivery of the mix to the site. The draw back of the current method is that the mix is committed to the truck without verification of that the air level in the mix is within specification.

The aforementioned U.S. patent application Ser. No. 13/583,062 (WFVA/CiDRA file nos. 712-2.338-1/CCS-0033, 35,40, and 45-49) discloses techniques for real time air measurement in wet concrete in concrete a rotary drum mixer, including implementing sensing technology in a hatch cover, as well as a stationary concrete mixer using an integrated sound source and two receivers, using SONAR-based technology developed and patented by the assignee of the instant patent application as well as that application.

SUMMARY OF THE INVENTION

The present application provides new means, techniques or ways of real time measurement of entrained air in wet concrete, consistent with and further building on that set forth in the aforementioned U.S. patent application Ser. No. 13/583,062, filed 12 Sep. 2012 (WFVA/CiDRA file nos. 712-2.338-1/CCS-0033, 35,40, and 45-49).

By way of example, the present invention provides new measurement devices that may include, or take the form of, acoustic-based air probes, e.g., that may be permanently installed in a precut hole on the side or bottom of a stationary mixer, or alternatively that may be handheld for taking the real time measurement. The same or a substantially similar installation technique of installing in the precut hole of the stationary mixer may be used or applied for applications related to a rotating drum style mixer, or other type or kind of mixer, consistent with that disclosed herein. By way of example, these measurement devices according to the present invention may be used for real time air measurement on the stationary mixer (such as a twin shaft, counter current, planetary, pan etc.) during the mixing process. With real time air measurement, an operator will be able to improve the quality control of all concrete produced. Entrained air level in concrete may be controlled to a tighter tolerance. With tight air control, the mix design can be optimized by reducing cement and replacing it with sand, fly ash or another filler, while still achieving the desired strength requirement.

This will reduce cost, improve workability and reduce "bleeding" incidents. There are many types of concrete that are made in stationary mixers, including precast, prestress, architectural, paving, block, ready mix—central mixers primarily in but limited to Europe, etc. All these types of concrete will likely benefit from real time air control, according to the present invention.

With real time air information the operator will now have the ability to adjust the air levels (manually or automatically (via a process control)) through chemical addition prior to dumping the concrete from the mixer. An automatic closed loop system may be used that includes these types of measurement devices with real time air information output to the control room or to the dosing pump, chemical dosing pumps, air related chemicals and the engineering expertise to tie it all together.

The Acoustic-based Air Probe

According to some embodiments, the present invention may include, or take the form of, apparatus featuring an acoustic-based air probe having an acoustic source configured to provide an acoustic signal into a mixture of concrete; and an acoustic receiver configured to be substantially co-planar with the acoustic source, to respond to the acoustic signal, and to provide signaling containing information about the acoustic signal injected into the mixture of concrete.

The present invention may also include, or take the form of, some combination of the following features:

The acoustic-based air probe may include a planar probing surface having a first aperture formed therein configured to receive part of the acoustic source, e.g., a rigid hardened steel piston. The planar probing surface may include at least one second aperture formed therein configured to receive part of the acoustic receiver, e.g., a protective polyurethane rubber fill. The planar probing surface may be configured as a hardened steel face plate.

The acoustic-based air probe may include the protective polyurethane rubber member arranged as the part in the at least one second aperture.

The acoustic receiver may include a dynamic pressure transducer.

The acoustic receiver may be configured to receive acoustic signals having a frequency in a range of about 100-500 Hz, including 330 Hz.

The acoustic source may include, or be configured as, a floating mass.

The acoustic source may include a piston module assembly having the rigid hardened steel piston configured with a channel to receive a piston shaft. The apparatus may include a vibration isolated actuator block assembly having a stationary voice coil actuator field assembly in combination with a voice coil actuator field assembly having an accelerometer transducer, the vibration isolated actuator block assembly being configured to drive the piston shaft.

The acoustic-based air probe may include a fluid/media temperature sensor.

The acoustic-based air probe may include a voice coil temperature sensor.

The acoustic-based air probe may include two acoustic receivers, including two dynamic pressure transducers.

The apparatus may include dosing apparatus configured to respond to the signaling, and provide a control signal to control the dosing of a chemical to be added or subtracted from the mixture.

The present invention can also provide new techniques for real time air measurement applications and techniques for wet concrete, including techniques using, or based at least partly on determining gas volume fraction (GVF) for a mixture of concrete that is ready mixed in a stationary mixer, a rotating drum mixer, a pump boom or truck chute, application forms made in a precast facility, a handheld unit.

For example, the apparatus may include a stationary mixer having a wall with the acoustic-based air probe arranged therein, including where the stationary mixer is configured with a central chemical dosing location to allow for more even distribution of chemicals into the mixing.

The apparatus may include a concrete pump boom having a wall with the acoustic-based air probe arranged therein.

The apparatus may include a precast form having a wall with the acoustic-based air probe arranged therein.

The apparatus may include a ready mix truck rotating drum mixer having a wall with the acoustic-based air probe arranged therein.

The apparatus may include a ready mix truck chute having a wall with the acoustic-based air probe arranged therein.

The acoustic-based air probe may be configured to work in conjunction with a signal processor that is configured to perform one or more of the signal processing functions disclosed herein.

The real time air measurement applications and/or signal processing may include, or take the form of, the following:

For example, the apparatus may include the signal processor that may be configured to receive the signaling containing information about the acoustic signal injected into the mixture of concrete; and determine a gas volume fraction of the mixture of concrete based at least partly on a speed of sound measurement of the acoustic signal that travels through the mixture, using a SONAR-based technique, consistent with that set forth in the aforementioned U.S. patent application Ser. No. 13/583,062, filed 12 Sep. 2012 (WFVA/CiDRA file nos. 712-2.338-1/CCS-0033, 35,40, and 45-49).

Alternatively, the signal processor may be configured to receive the signaling containing information about the acoustic signal injected into the mixture of concrete; and determine the measurement of air percentage in the mixture of concrete based at least partly on the dual frequency technique that depends on the relationship between the acoustic signal injected and the signaling received.

The dual frequency technique may include, or take the form of, the signal processor being configured to determine the measurement of air percentage in the mixture of concrete based at least partly on mixing a reference signal with a detected signaling using a phase sensitive lock-in approach.

Alternatively, the dual frequency technique may include, or take the form of, the signal processor being configured to determine the measurement of air percentage in the mixture of concrete based at least partly on correlating the acoustic signal injected and the signaling received.

According to some embodiments of the present invention, the apparatus may form part of a handheld device, including where the aforementioned acoustic-based air probe is configured on one end of the handheld device and a handle is configured on the other end of the handheld device.

The Handheld Acoustic-based Air Probe

According to some embodiments, the apparatus may also include, or take the form of, a handheld acoustic-based air probe featuring an acoustic source configured to provide an acoustic signal injected into a mixture of concrete; and an acoustic receiver configured to respond to the acoustic signal, and provide signaling containing information about the acoustic signal injected into the mixture of concrete.

The handheld acoustic-based air probe may include one or more of the following features:

The handheld acoustic-based air probe may include at least one spacer strut configured to connect the acoustic source and the acoustic receiver so as to form a space for receiving a portion of the mixture of the concrete when the handheld acoustic-based air probe is dipped into the mixture of concrete and the acoustic signal is transmitted through the mixture. The at least one spacer strut may include, or take the form of, three spacer struts that are triangularly arranged and equally-spaced to connect the acoustic source and acoustic receiver so as to form the space in-between. The at least one spacer strut may include a wiring channel for providing a wire from the acoustic receiver.

The handheld acoustic-based air probe may include a sealed end cap assembly configured to contain the acoustic receiver in a sealing manner.

The handheld acoustic-based air probe may include a sealed assembly configured to contain the acoustic source in a sealing manner. The sealed assembly may include a vibration isolated actuator block configured to actuate the piston source. The vibration isolated actuator block may include a voice coil actuator moving coil assembly with an accelerometer transducer and a stationary voice coil actuator field assembly. The sealed assembly may include hemisphere vibration mounts configured between an alignment cap and the vibration isolated actuator block and also configured between the vibration isolated actuator block and the acoustic source. The sealed assembly may include a spring seal, including a cast urethane spring seal, configured between the acoustic source and an acoustic source retaining member, and a photo-etched flexure configured between the acoustic source and the acoustic source retaining member. The sealed assembly may include a temperature sensor configured to respond to the temperature of the mixture.

The handheld acoustic-based air probe may include a second acoustic receiver configured to respond to the acoustic signal, and provide further signaling containing information about the acoustic signal injected into the mixture of concrete.

The second acoustic receiver may be configured on the sealed assembly so as to receive the acoustic signal that is reflected from the mixture of concrete.

The acoustic source and the acoustic receiver may be configured on one end of the handheld acoustic-based air probe. The handheld acoustic-based air probe may include another end configured with some combination of device handles, a normal pressure sensor connector, an accelerometer connector and a temperature and drive connector.

According to some embodiments, the apparatus may also include an acoustic probe apparatus having two acoustic sources configured to provide two reference signals, consistent with that set forth herein.

CCS-0067 and 0104

The Signal Processor of Dual Frequency Techniques

According to some embodiments of the present invention, the apparatus may include, or take the form of, a signal processor configured to receive signaling containing information about an acoustic signal injected into a mixture of concrete; and determine a measurement of air percentage in the mixture of concrete based at least partly on a dual frequency technique that depends on a relationship between the acoustic signal injected and the signaling received.

CCS-0067: Phase Sensitive Dual Frequency Lock-in Measurement for Concrete Air Content with Quality Factor According to some embodiments of the present invention, the dual frequency technique may include the acoustic signal injected being a reference signal; the signaling received being detected signaling; and the signal processor may be configured to determine the measurement of air percentage in the mixture of concrete based at least partly on mixing the reference signal with the detected signaling using a phase sensitive lock-in approach.

According to some embodiment of the present invention, the signal processor may be configured to determine a resulting signal based at least partly on the mixing of the reference signal with the detected signaling; filter the resulting signal, including with a low pass filter, to get a DC component; and determine a value that is proportional to amplitude and phase components of the detected signaling at the frequency of the reference signal. The signal processor may also be configured to determine a corresponding value that is proportional to corresponding amplitude and phase components of the detected signaling with the frequency of reference signal shifted by 90 deg. The signal processor may also be configured to determine a signal phase difference based at partly on the following: using $\ominus\text{ref}$ as a reference phase, $\ominus\text{det}$ as a detected phase, Adet as a detected signal amplitude at a frequency of interest; and determining a signal amplitude and the signal phase difference using the following set of equations:

$\ominus = \ominus\text{det} - \ominus\text{ref}$, $X \sim \text{Adet} \cos(\ominus)$, $Y \sim \text{Adet} \cos(\ominus + 90\text{deg}) = \text{Adet} \sin(\ominus)$, Signal amplitude=Adet=$(X^2 * Y^2)^{1/2}$, and Signal phase difference=e=$\tan^{-1}(Y/X)$.

The signal processor may be configured to determine a time of propagation of the reference signal in the mixture of concrete and then a speed of sound measurement, based at least partly on the signal phase difference determined along with the frequency.

According to some embodiment of the present invention, the signaling may contain information about two reference signals that are injected into the mixture of concrete at different frequencies in order correct or compensate for ambiguity that may otherwise exist once the detected signaling has gone though a propagation time equal to 2*pi of a single injected acoustic signal, including any multiple thereof; and the signal processor is configured to determine a relative phase between the two reference signals in order correct or compensate for the ambiguity.

According to some embodiments of the present invention, the signal processor may be configured to determine a quality metric based at least partly on the signal amplitude and signal phase difference determined. For example, the signal processor may be configured to take the signal amplitude of a signal of interest at Asig; take a sample of four other comparison signals spaced adjacent thereto of A0, A1, A2 and A3; average four other comparison signals to obtain an adjacent noise Anoise =(A0+A1+A2+A3)/4; and take a difference over a sum normalization to determine a quality signal, Q, that varies between −1 to 1 based at least partly on using the following equation:

$Q=(Asig-Anoise)/(Asig+Anoise)$, with a ratio of "1" representing a good quality, a ratio of "0" indicating same signal strength at frequency of interest as other frequencies, and a ratio of "−1" as a very weak signal of interest.

CCS-0104

According to some embodiments of the present invention, the dual frequency technique may include the signal processor being configured to determine the measurement of air percentage in the mixture of concrete based at least partly on correlating the acoustic signal injected and the signaling received.

According to some embodiments of the present invention, the signal processor may be configured to determine a phase delay due to a transit of the acoustic signal injected in the mixture of concrete based on the correlating of the acoustic signal injected and the signaling received. The signal processor may be configured to determine the speed of sound based on the phase delay. The signaling containing information about the acoustic signal injected into the mixture of concrete may be based at least partly on using a simple sweep of an excitation frequency to an acoustic actuator, which increases the sensitivity of a correlation process. The simple sweep may be based on the equation:

$Y(i)=A \sin(a\ i^2/2+bi)$.

According to some embodiments of the present invention, the signaling containing information about the acoustic signal injected into the mixture of concrete may be based at least partly on one or more techniques of encoded pulsing that are used to alternatively enhance the signal-to-noise of a detected acoustic signal. The encoded pulsing may be based at least partly on a pseudo-random sequence (PRBS), where the PRBS is defined as a sequence of N bits where an autocorrelation of the sequence gives a number proportional to the number of "on" bits times the sequence length when there is no misalignment and a low number proportional to only the number of on bits when misaligned. The PRBS in the case of free-space acoustic measurements may be based at least partly on PRBS excitation that can be created by turning on and off an excitation acoustic wave according to the PRBS sequence, or by frequency modulating the acoustic signal by the PRBS sequence. The signaling containing information about the acoustic signal injected into the mixture of concrete may be based at least partly on frequency encoding, including m-sequence codes or frequency shift keying approaches.

Methods

According to some embodiments of the present invention, the present invention may take the form of a method that may include, or take the form of, steps for receiving in a signal processor signaling containing information about an acoustic signal injected into a mixture of concrete; and determining in the signal processor a measurement of air percentage in the mixture of concrete based at least partly on a dual frequency technique that depends on a relationship between the acoustic signal injected and the signaling received. According to some embodiments of the present invention, the method may include determining in the signal processor the measurement of air percentage in the mixture of concrete based at least partly on mixing a reference signal with a detected signaling using a phase sensitive lock-in approach. According to some embodiments of the present invention, the method may include determining in the signal processor the measurement of air percentage in the mixture of concrete based at least partly on correlating the acoustic signal injected and the signaling received. These methods may also include one or more of the features set forth herein.

According to some embodiments of the present invention, the method may include, or take the form of, steps for vibrating with one part of a handheld vibration assembly a wet concrete medium; and responding with another part of the handheld vibration assembly to the wet concrete medium being vibrated in order to provide signaling containing information about the wet concrete medium being vibrated to be used to determine entrained air in the wet concrete medium.

This method may also include some combination of the following features:

The signaling may be provided as output signaling from on the handheld vibration assembly to be received and used by a signal processor to determine entrained air in the wet concrete medium.

The step of vibrating may include actuating a vibration isolated actuator block assembly that forms part of the handheld vibration assembly.

The method may also include responding to the concrete medium being vibrated with at least one pressure transducer that forms part of the handheld vibration assembly, or providing from the at least one pressure transducer the signaling, or responding to the vibrating concrete medium with two pressure transducers that forms part of the handheld vibration assembly, and/or providing the signaling from the two pressure transducers.

The method may also include determining a measurement of the entrained air in wet concrete, including using SONAR-based technique to determine the measurement.

The method may include adding chemicals to control the entrained air in wet concrete based at least partly on the signaling.

The signaling may be wireless signaling.

The signaling may be displayed on the handheld vibration assembly.

The signal processor may be configured with at least one processor and at least one memory including computer program code, the at least one memory and computer program code configured, with the at least one processor, to cause the apparatus at least to determine the entrained air in the wet concrete medium.

The method may include responding to a user command containing information about vibrating with the handheld vibration assembly the wet concrete medium.

The user command may include input signaling received by the handheld vibration assembly.

The user command may be provided by pressing a button on the handheld vibration assembly.

The method may include vibrating a floating mass that forms part of a vibration isolated actuator assembly at a frequency in a range of about 100-500 Hz.

The present invention makes important contributions to this current state of the art for real time air measurement in wet concrete, as well as techniques to control the amount of air in a mixture of concrete.

Communication Techniques

According to some embodiments, the present invention may take the form of a system featuring a combination of an acoustic sensor and a communication transmitter. The acoustic sensor may be arranged on a rotating container or drum having a slurry contained therein, including concrete, and configured to provide an acoustic sensor signal, sense an acoustic signal containing information about a characteristic of the slurry, and provide acoustic sensor signaling containing information about the acoustic signal sensed. The communication transmitter may be arranged on the rotating container or drum, and configured to receive the acoustic sensor signaling, and provide the acoustic sensor signaling received from the rotating container or drum for further processing.

According to some embodiments, the communication transmitter may include a slip-ring. The slip-ring may include, or take the form of, a mechanical slip-ring installed on the rotating container or drum of a ready-mix truck to permit electrical connections from the rotating container or drum for further processing. The ready-mix truck may include an electrical system, including a telemetry system, and the electrical connections may be coupled to the electrical system.

According to some embodiments, the communication transmitter may include an infrared (IR) communication system. The IR communication system may be configured to send the acoustic sensor signaling to an IR receiver module located on a chassis of a ready-mix truck. The IR communication system may include an IR transmitter configured to provide the acoustic sensor signaling as the rotating container or drum rotates and points to the receiver module. According to some embodiments, the communication transmitter may include a radio frequency (RF) transmitter. The RF communication system may be configured to send the acoustic sensor signaling to an RF receiver module located on a chassis of a ready-mix truck. The RF communication system may include Wi-Fi, industrial wireless such as 802.15.4 and Bluetooth. According to some embodiments, the communication transmitter may include a cellular and satellite radio transmitter. The cellular and satellite radio transmitter may be configured, or forms part of the acoustic sensor.

Power Saving Techniques According to some embodiments, the present invention may take the form of a system featuring an acoustic sensor in combination with a power system. The acoustic sensor may be arranged on a rotating container or drum having a slurry contained therein, including concrete, and configured to provide an acoustic signal to sense an acoustic signal containing information about a characteristic of the slurry, and provide acoustic sensor signaling containing information about the acoustic signal sensed. The power system may be arranged on the rotating container or drum, and configured to receive a power signal, and provide a power control signal to the acoustic sensor to activate and power the acoustic sensor to make a full air measurement to sense the characteristic of the slurry, and de-activate the acoustic sensor and remove the power after making the full air measurement.

According to some embodiments, the power system may include a wetted detection sensor. The wetted detection sensor may be configured to determine when the acoustic sensor is in contact with the concrete and provide wetted detection sensor signaling containing information to de-activate the acoustic sensor if not. The wetted detection sensor may be configured to determine when the acoustic sensor is at the top of a container or drum rotation or when the rotating container or drum is empty, and provide the wetted detection sensor signaling containing information to de-activate the acoustic sensor. The wetted detection sensor may be a dedicated sensor such as a wetness sensor, or a load sensor, or a pressure sensor that is used in the air measurement and can be queried to determine when pressure is applied to the sensor by the concrete.

According to some embodiments, the power system may include a rotation sensor configured to sense an angular rotation of the rotating container or drum and provide rotation sensor signaling containing information about the angular rotation. The power system may be configured to respond to the rotation sensor signaling and provide power to the acoustic sensor when the acoustic sensor is at the bottom of the rotating container or drum in the concrete. The power system may be configured to activate the acoustic sensor when in a range of about +/−10 degrees around the bottom of the rotating container or drum. The power system may be configured to determine the rotation speed of the rotating container or drum and activate the acoustic sensor based upon the rotation speed determined.

BRIEF DESCRIPTION OF THE DRAWING

The drawing includes FIGS. 1a-12, which are not necessarily drawn to scale, as follows:

FIG. 1b is an axial view of one end the acoustic probe shown in FIG. 1a.

FIG. 1c is an axial view of another end the acoustic probe shown in FIG. 1a.

FIG. 3c is a cross-sectional view of the handheld acoustic probe shown in

FIG. 3b along section lines A-A, according to some embodiments of the present invention.

FIG. 4 is a block diagram of apparatus having a signal processor, according to some embodiment of the present invention.

FIG. 10 is a diagram showing an end cross-section of a concrete truck drum having an AIRtrac™ sensor entering and exiting the concrete as the concrete truck drum.

FIG. 11 is a block diagram of a system having an acoustic sensor in combination with a communications transmitter, according to some embodiments of the present invention.

FIG. 12 is a block diagram of a system having an acoustic sensor in combination with a power system, according to some embodiments of the present invention.

DETAILED DESCRIPTION OF BEST MODE OF THE INVENTION

The parent application includes the subject matter disclosed in relation to FIGS. 1a through FIG. 6, as follows:

CCS-0075: FIGS. 1a-2b,

Real Time Air Measurement Applications in Wet Concrete

Figure 1A:
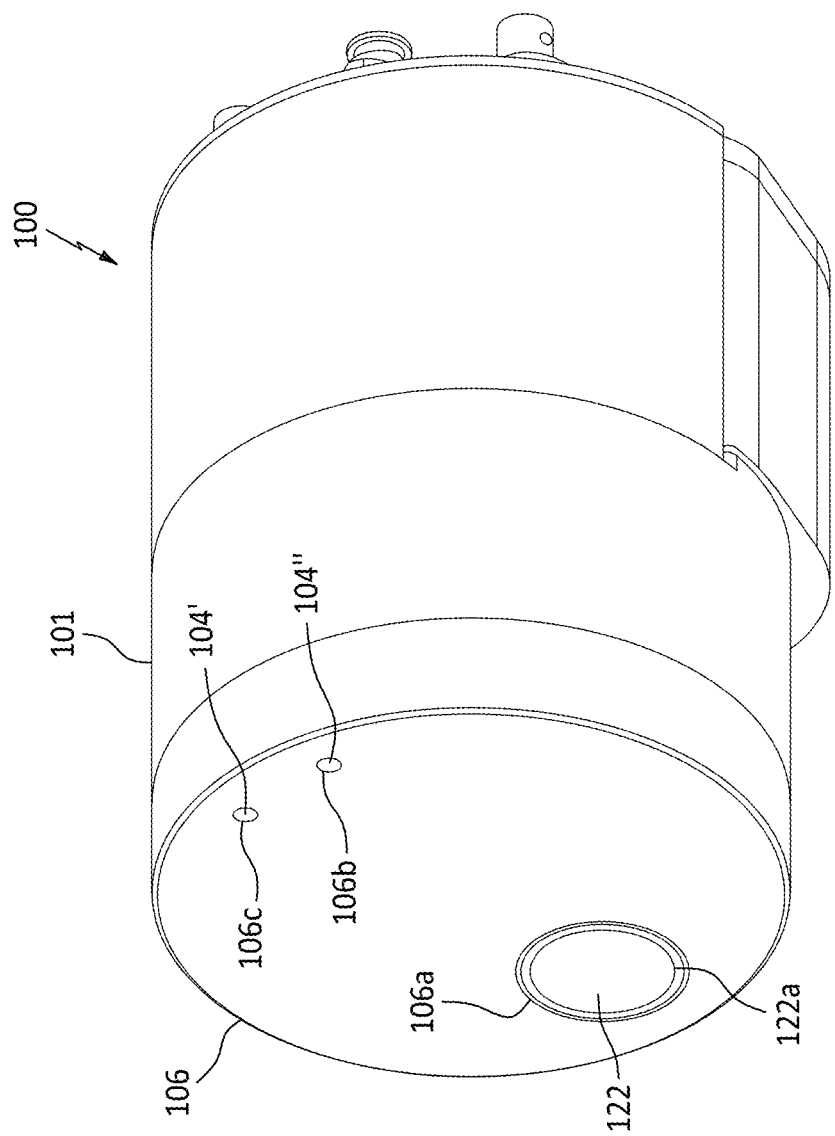
FIG. 1a is a perspective view of an acoustic probe that may implemented some embodiments of the present invention.
Figure 1B:
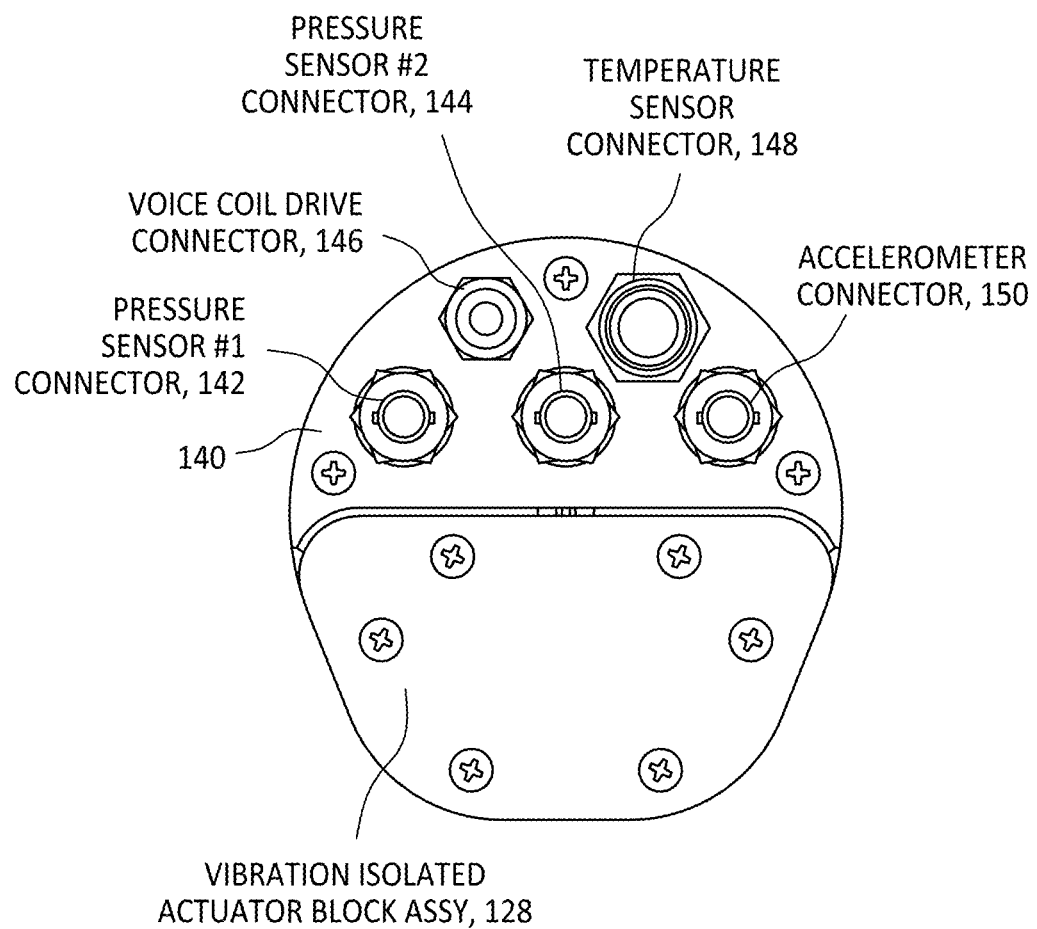
Figure 1C:
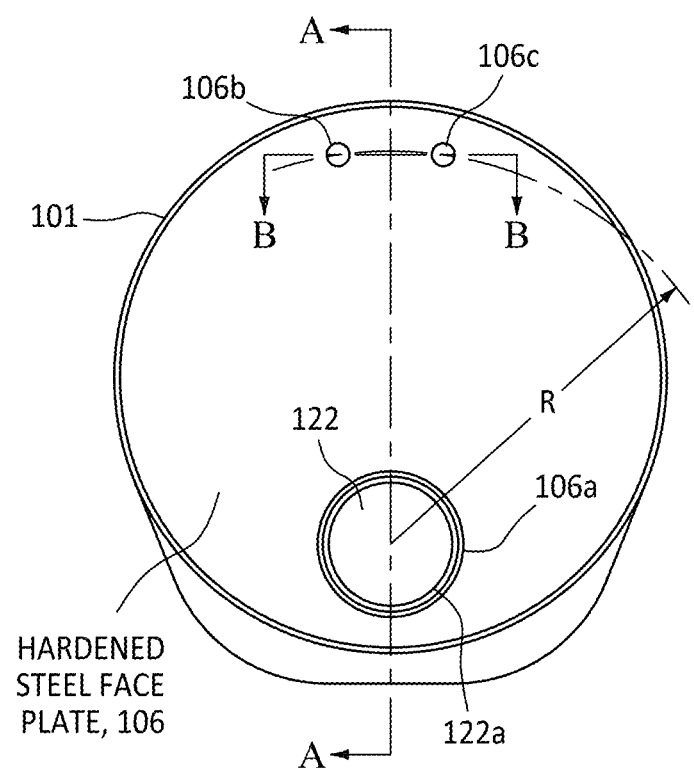
Figure 1D:
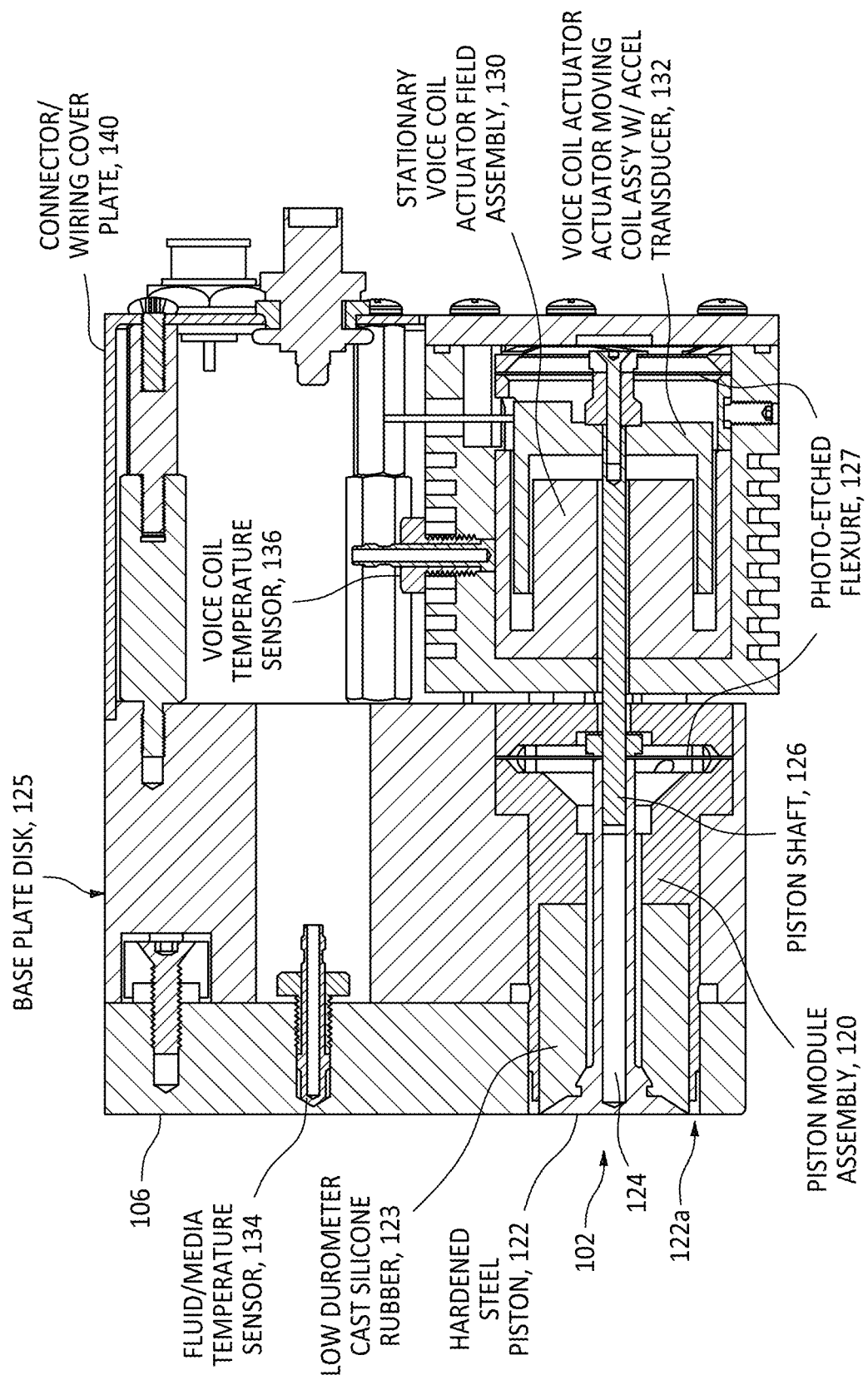
FIG. 1d is a sectional view of the end the acoustic probe shown in FIG. 1c along section lines A-A.
Figure 1E:
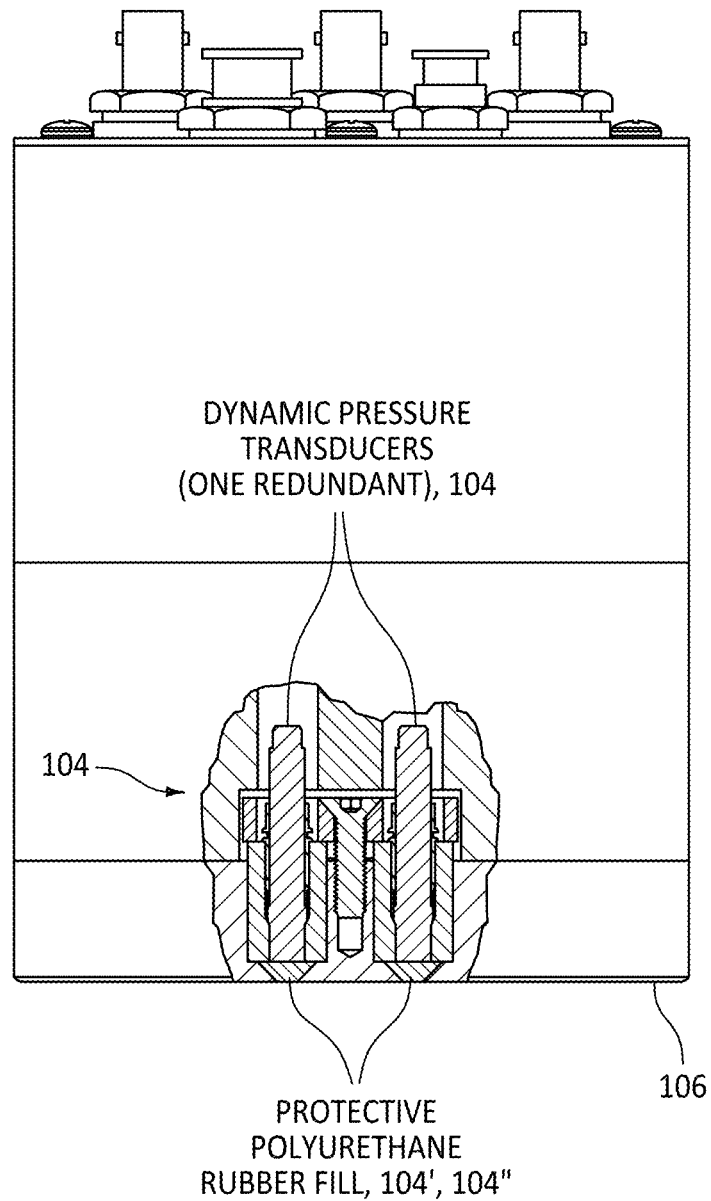
FIG. 1e is a sectional view of the end the acoustic probe shown in FIG. 1c along section lines B-B.

FIGS. 1a to 1e show the present invention in the form of apparatus generally indicated as 100 that may include an acoustic-based air probe like element 101. The acoustic-based air probe 101 may include an acoustic source generally indicated as 102 (see FIG. 1d) configured to provide an acoustic signal into a mixture of concrete; and an acoustic receiver generally indicated as 104 (see FIG. 1e) configured to be substantially co-planar with the acoustic source 102, to respond to the acoustic signal, and to provide signaling containing information about the acoustic signal injected into the mixture of concrete. By way of example, the acoustic source 102 may consist of an arrangement of parts and components and is best shown in detail in FIG. 1d. By way of example, the acoustic receiver 104 may consist of at least an arrangement of one or more transducers and fills and is best shown in FIG. 1e.

The acoustic-based air probe 101 may include a planar probing surface 106 having a first aperture 106a formed therein configured to receive part of the acoustic source 102, including a hardened steel piston 122, as best shown in FIG. 1d. At the interface with the planar probing surface 106, the hardened steel piston 122 is surrounded by a circumferential channel 122a, so as not to be in physical contact with the planar probing surface 106. The planar probing surface 106 may include at least one second aperture 106b, 106c formed therein configured to receive at least one part 104', 104" of the acoustic receiver 104. The part 104', 104" are shown as a protective polyurethane rubber member in FIG. 1e. The planar probing surface 106 may be configured as a hardened steel face plate, although the scope of the invention is intended to include using other type or kinds of materials either now known or later developed in the future. The acoustic receivers 104 are configured in relation to the center of the hardened steel piston 122 of the acoustic source 102 and defined by a radius R, as best shown in FIG. 1c, so that the acoustic receivers 104 are arranged and configured substantially on the circumference of a circle defined by the radius R from the center of the hardened steel piston 122.

The acoustic receiver 104 may include, or take the form of, a dynamic pressure transducer, as best shown in FIG. 1e.

In operation, and by way of example, the acoustic receiver 104 may be configured to receive acoustic signals, e.g., having a frequency in a range of about 100-500 Hz, including 330 Hz, although the scope of the invention is intended to include using other frequencies and other ranges either now known or later developed in the future.

By way of example, the acoustic source 102 may include, or take the form of, or be configured as, a floating mass, consistent with that shown in FIG. 1d.

In FIG. 1d, the acoustic source 102 is shown in the form of a piston module assembly 120 having the rigid hardened steel piston 122 configured with a channel 124 to receive, or be coupled to, a piston shaft 126. The acoustic-based air probe 101 has a base plate disk 125 that contains the piston module assembly 120, as well as other components in FIG. 1d. The rigid hardened steel piston 122 is enclosed, surrounded and configured to move in relation to a low durometer cast silicone rubber 123 and photo-etched flexures 127, so as to provide the floating mass aspect of the acoustic source 102. The low durometer cast silcone rubber 123 may also be configured to perform sealing functionality in relation to the mixture of the concrete. The acoustic source 102 may also include a vibration isolated actuator block assembly 128, best identified in FIG. 1b, having a stationary voice coil actuator field assembly 130 in combination with a voice coil actuator field assembly 132 having an accelerometer transducer configuration. The vibration isolated actuator block assembly 128 may be configured to drive and vibrate the piston shaft 126, consistent with that shown in FIG. 1d, so as to provide the acoustic signal to the mixture of the concrete when the acoustic-based air probe is inserted into the mixture. The apparatus 100 may also be configured with signal processing technology (not shown) for driving the acoustic source 102, as would be appreciated by a person skilled in the art.

The acoustic-based air probe 101 may include a fluid/media temperature sensor 134, consistent with that shown in FIG. 1d, configured to provide a temperature reading of the mixture.

The acoustic-based air probe 101 may include a voice coil temperature sensor 136, consistent with that shown in FIG. 1d, configured to provide a temperature reading of the stationary voice coil actuator field assembly 130.

The acoustic-based air probe 101 may include two acoustic receivers 104, 104', that may take the form of the two dynamic pressure transducers, consistent with that shown in FIG. 1e.

The acoustic-based air probe 101 may include some combination of a connector/wiring cover plate 140, and various connectors configured in relation to the same, including a pressure sensor no. 1 connector 142 for providing the signaling in relation to one pressure sensor, a pressure sensor no. 2 connector 144 for providing the signaling in relation to the other pressure sensor, a voice coil drive connector 146 for providing the signaling in relation to the voice coil drive 130 (FIG. 1d), a temperature sensor connector 148 for providing the signaling in relation to a temperature, and an accelerometer connector 150 for providing the signaling in relation to the voice coil actuator moving coil assembly 132 (FIG. 1d), all shown in FIG. 1b.

Applications

Figure 2A:
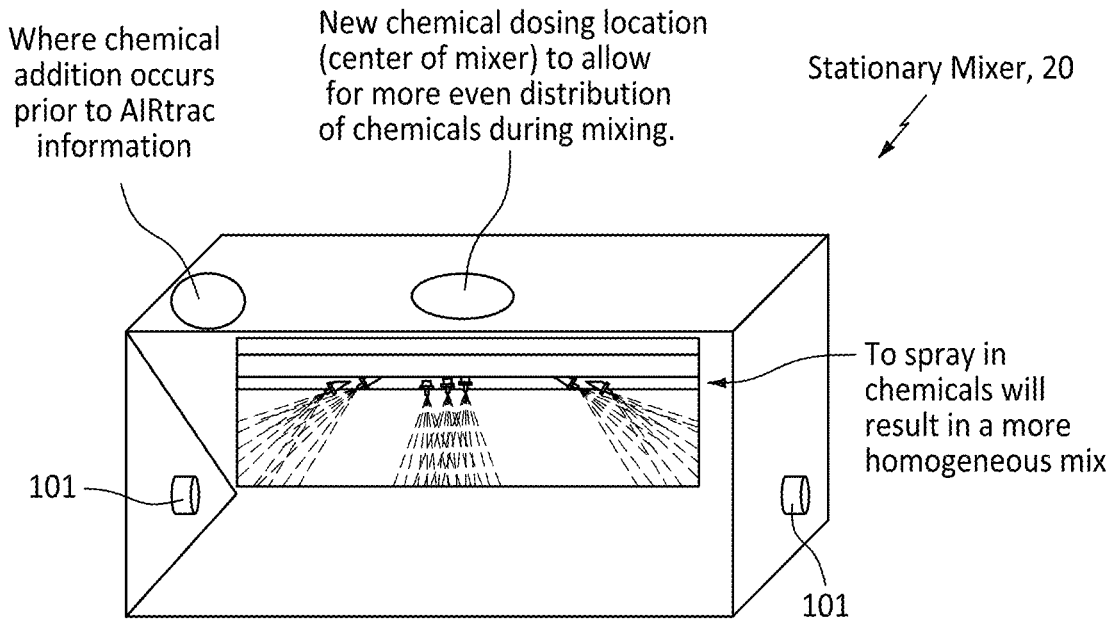
FIG. 2a is a diagram of a stationary mixer having a new dosing location in the center of the mixer to allow for an even distribution of chemicals during mixing, according to some embodiment of the present invention.

The apparatus 100 may include, or take the form of, a stationary mixer 20 having a wall 20a with the one or more acoustic-based air probes 101 arranged therein, including where the stationary mixer 20 is configured with a central chemical dosing location 20b to allow for more even distribution of chemicals into the mixing. In FIG. 2a, the acoustic-based air probe or measurement device 101 according to the present invention, is shown arranged in a precut hole 20c of the stationary mixer 20. Instrumenting the stationary mixer 20 with more than one air meter or acoustic-based air probe 101 (for example: one on the left side and one on the right side) will help in understanding the mixing efficiency and performance of a particular mixer. With this information different techniques may be implemented to improve homogeneity of the entire mixed batch. The addition of the admix chemicals made may need to be spread (sprayed) more evenly throughout the mixing area rather than streamed in one location. Or the more centralized dosing location 20b may also be an improvement on current methodology.

The apparatus 100 may also include dosing apparatus (not shown) configured to respond to the signaling, and provide a control signal to control the dosing of a chemical to be added or subtracted from the mixture, e.g., including to the dosing location 20a shown in FIG. 2a.

Figure 2B:
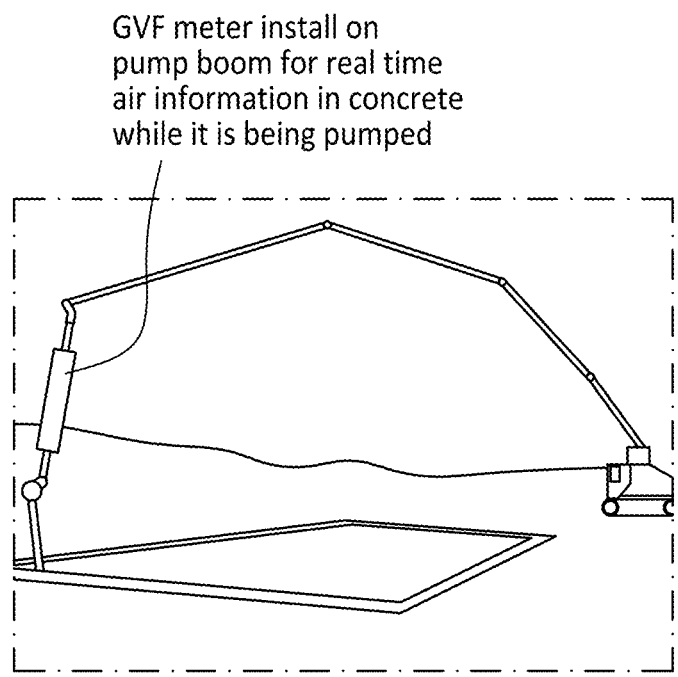
FIG. 2b is a diagram of a GVF meter installed on a pump boom for real time air information in concrete while it is being pumped, according to some embodiments of the present invention.

The apparatus 100 may include a concrete pump boom having a wall with the acoustic-based air probe arranged therein, consistent with that shown in FIG. 2b.

Precast Applications

Form Application—Forms used in a precast facility would benefit from being instrumented with entrained air measurement capability. This would enable a concrete producer to measure entrained air levels in concrete as the form is being filled. This will also give them an understanding of how much air is lost from the concrete mixer to placement into the form and will enable better planning to meet air specification. According to some embodiments of the present invention, the apparatus 100 may include, or take the form of, a precast form (not shown) having a wall with the acoustic-based air probe 101 arranged therein.

Ready Mix Applications

Pumping Application—Ready Mix Boom Pump—This application can utilize the known SONAR-based SOS GVF meter developed by the assignee of the instant patent application may also be used for real time entrained air information in the concrete as it is being pumped in order to control and understand air levels in wet concrete, which is very important. Too much air will effect strength and too little air will effect the durability (freeze/thaw) of the concrete. Since a great deal of ready mix concrete is pumped into place at job sites every day, it is important to know how the pumping of entrained air concrete can effect the air content in concrete. Once the air level in the concrete is understood at placement the appropriate adjustments can be made further upstream to compensate for the air loss during pumping. Theories concerning air losses within the concrete mix during pumping include: the large drop within the boom, high pressure within the pipes, pump configurations and attachments and the materials used in the concrete mix.

Ready Mix Stationary Central Mixer: The known SONAR-based SOS technology developed by the assignee of the instant patent application may also be used for real time air information in ready mix stationary central mixers. In many areas of the world (especially Europe), the wet batching process utilizes stationary mixers.

Ready Mix Truck Rotating Drum Mixer: The known SONAR-based SOS technology developed by the assignee of the instant patent application may also be used for ready mix truck rotating drum mixer or stationary mixers. The primary difference will be that this unit can be battery operated and will transmit the real time air data wirelessly. This information will enable every batch of ready mix concrete to arrive at the job site within air specification. According to some embodiments of the present invention, the apparatus 100 may include, or take the form of, a ready mix truck rotating drum mixer (not shown) having a wall with the acoustic-based air probe 101 arranged therein.

Air level will be monitored the entire travel time and can be adjusted if necessary by chemical addition.

Ready Mix Rotating Drum Central Mixer: These central mixers are very similar to the truck mixers, only usually a little larger. The rotating drum central mixers are usually 10-12 yards in size. Real time air information will allow for precise control of air before the batch is dumped into the truck.

Ready Mix Truck Chute Application: Ready mix truck delivery chute for real time air information. This would be mounted in such a way that an air measurement would be made as the concrete passes over it as it exits the truck. According to some embodiments of the present invention, the apparatus 100 may include, or take the form of, a ready mix truck chute (not shown) having a wall with the acoustic-based air probe 101 arranged therein.

Form Application, including Ready Mix Forms: This application may take the form of a disposable devise that could make an air measurement of the wet concrete after the form is filled.

FIGS. 3a to 3d: Handheld unit or Acoustic-based Air Probe

FIGS. 3a to 3d show the present invention as apparatus in the form of a handheld unit or acoustic-based air probe 50, according to some embodiments of the present invention. The acoustic-based air probe 50 may be configured with a probe portion 52 and a handle portion 54. The handheld unit or acoustic probe 50 can be used both in precast and ready mix once concrete is poured into any form. The probe portion 52 of the handheld unit 50 may be submerged or dipped into the concrete, a noise source activated therein and sound speed measurement made, consistent with that disclosed herein. This technique may potentially take the place of, or augment or compliment, a known Type B pressure pod currently utilized in and by the industry.

The probe portion 52 may be configured with an acoustic source 56 configured to provide an acoustic signal injected into a mixture of concrete; and an acoustic receiver 58 configured to respond to the acoustic signal, and provide signaling containing information about the acoustic signal injected into the mixture of concrete. In FIG. 3d, the acoustic source 56 is shown in the form of a piston acoustic source, and the acoustic receiver 58 is shown in the form of a dynamic pressure transducer, although the scope of the invention is intended to include other types or kind of acoustic sources and acoustic receivers either now known or later developed in the future.

The probe portion 52 may also be configured with at least one spacer strut 60 configured to connect one member 62 of the probe portion 52 having the acoustic source 56 to the other member 64 of the probe portion 52 having the acoustic receiver, so as to form a space in-between configured for receiving a portion of the mixture of the concrete when first and second members 62, 64 of the probe portion 52 are dipped into the mixture of concrete and the acoustic signal is transmitted through the mixture. The at least one spacer strut 60 may include three spacer struts that are triangularly arranged and equally-spaced to connect the acoustic source and acoustic receiver so as to form the space in-between, as shown in FIGS. 3c and 3d, although the scope of the invention is intended to include using one strut, two struts, four struts, etc. The scope of the invention is not intended to be limited to the number of strut(s) being used, or the physical arrangement of the struts in relation to one another. The at least one spacer strut 60 may be configured with a wiring channel 60a for providing a wire from the acoustic receiver 58, as best shown in FIG. 3c.

The member 64 of the probe portion 52 may include a sealed end cap assembly 60a configured to contain the acoustic receiver in a sealing manner. The member 62 of the probe portion 52 may include a sealed assembly 62a configured to contain the acoustic source 56 in a sealing manner. The sealed assembly 62a may include a vibration isolated actuator block 62b configured to actuate the piston acoustic source 56. The vibration isolated actuator block 62b may include a voice coil actuator moving coil assembly 62c with an accelerometer transducer and a stationary voice coil actuator field assembly 62d. The sealed assembly 62a may include hemisphere vibration mounts 60e configured between an alignment cap 60f and the vibration isolated actuator block 62b and also configured between the vibration isolated actuator block 62b and the acoustic source 56, as best shown in FIG. 3d. The sealed assembly 62a may include a spring seal 62g, including a cast urethane spring seal, configured between the acoustic source 56 and an acoustic source retaining member 62h, and a photo-etched flexure 62i configured between the acoustic source 56 and the acoustic source retaining member 62h.

The member 62 of the probe portion 52 may include a second acoustic receiver 60j configured to respond to the acoustic signal, and provide further signaling containing information about the acoustic signal injected into the mixture of concrete. The second acoustic receiver 60j may be configured on the sealed assembly 62a so as to receive the acoustic signal that is reflected from the mixture of concrete. In contrast, the acoustic receiver 58 may be configured so as to receive the acoustic signal that is transmitted directly through the mixture of concrete.

The sealed assembly may also include a temperature sensor 60k configured to respond to the temperature of the mixture.

Figure 3A:
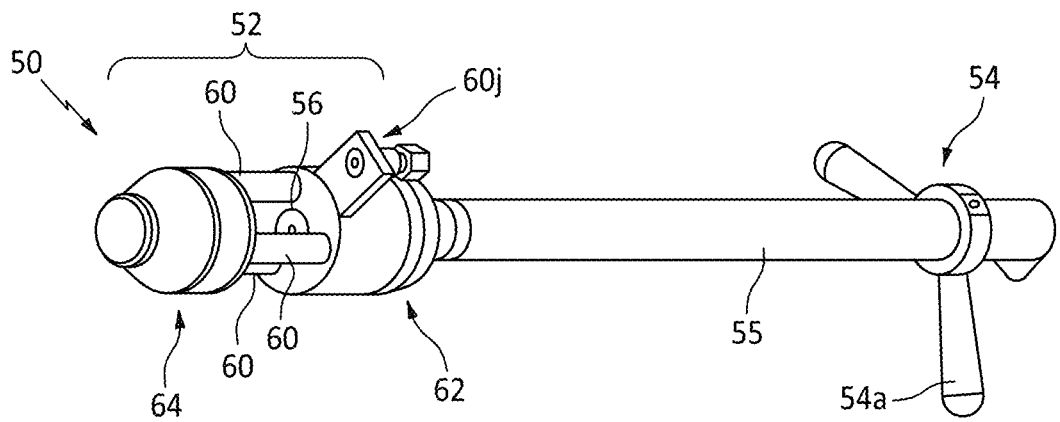
FIG. 3a is a diagram of a handheld acoustic probe, according to some embodiments of the present invention.
Figure 3B:
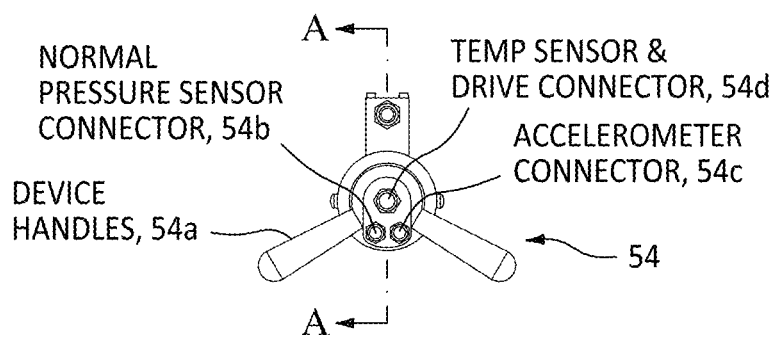
FIG. 3b is an axial view of the handheld acoustic probe shown in FIG. 3a, according to some embodiments of the present invention.
Figure 3C:
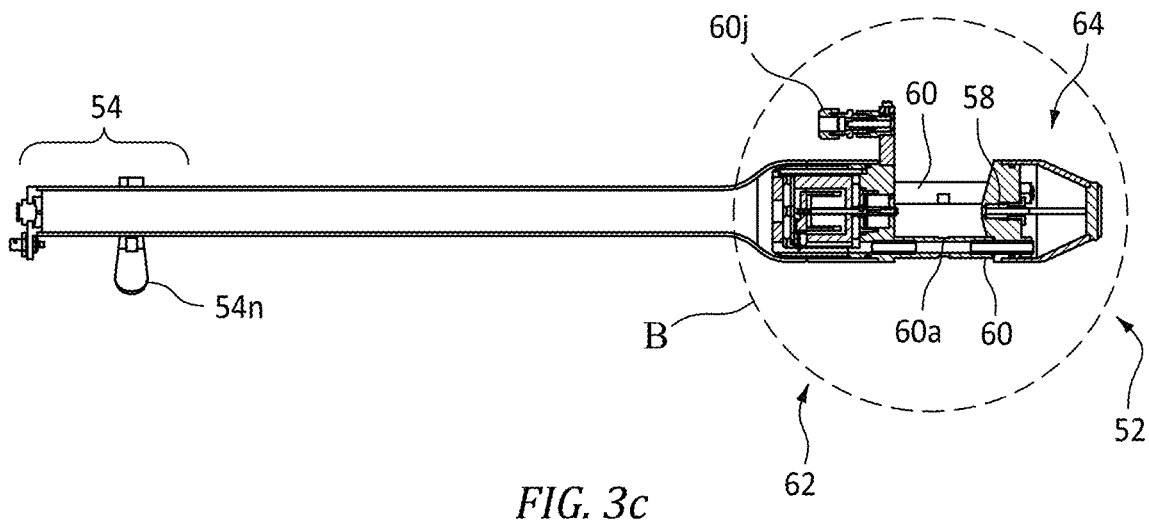
Figure 3D:
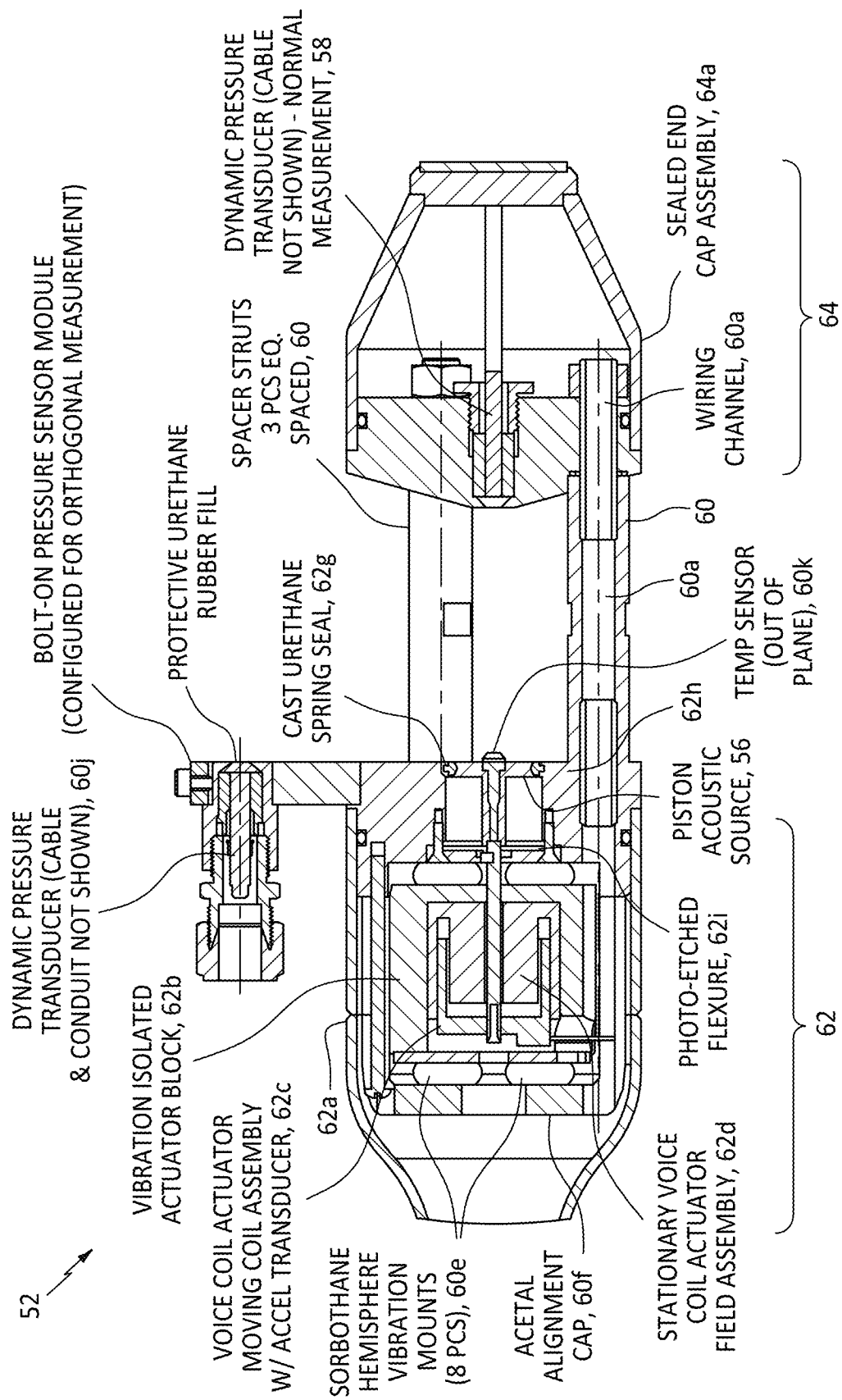
FIG. 3d is an enlarged view of a part of the handheld acoustic probe shown in FIG. 3c and labeled B, according to some embodiments of the present invention.

The handle portion 54 on the other end of the handheld acoustic-based air probe may be configured with some combination of device handles 54a, a normal pressure sensor connector 54b, an accelerometer connector 54c and a temperature and drive connector 54d, as best shown in FIGS. 3a and 3b.

According to some embodiments, the handheld acoustic-based air probe 50 may include a signal processor configured to perform the signal processing functionality consistent with that disclosed herein. By way of example, the signal processor may be configured to determine the measurement of air percentage in the mixture of concrete based at least partly on using other types or kinds of SONAR-based techniques either now known or later developed in the future, according to some embodiments of the present invention, and consistent with that disclosed herein. Alternatively, the signal processor may be configured to receive signaling containing information about an acoustic signal injected into a mixture of concrete, e.g., from the acoustic receiver 58 (see FIG. 3c); and determine a measurement of air percentage in the mixture of concrete based at least partly on a dual frequency technique that depends on a relationship between the acoustic signal injected, e.g., by the acoustic source 56, and the signaling received, according to some embodiments of the present invention, and consistent with that disclosed herein.

Alternatively, the acoustic signal injected may be a reference signal; the signaling received may be detected signaling; and the signal processor may be configured to determine the measurement of air percentage in the mixture of concrete based at least partly on mixing the reference signal with the detected signaling using a phase sensitive lock-in approach, according to some embodiments of the present invention, and consistent with that disclosed herein.

Alternatively, the signal processor may be configured to determine the measurement of air percentage in the mixture of concrete based at least partly on correlating the acoustic signal injected and the signaling received, according to some embodiments of the present invention, and consistent with that disclosed herein.

The scope of the invention is intended to be limited to the way or technique that the signal processor in the handheld acoustic-based air probe determines the measurement of air percentage in the mixture of concrete. By way of example, the signal processor may be configured or arranged in an intermediate portion 55 of the handheld unit 50, although the scope of the invention is intended to include configuring the signal processor somewhere else in the probe 50.

According to some embodiments, the handheld acoustic-based air probe 50 may provide the signaling containing information about an acoustic signal injected into a mixture of concrete, e.g., from the acoustic receiver 58, to a signal processor that is external to, and does not form part of, the handheld acoustic-based air probe 50, which determines the measurement of air percentage in the mixture of concrete based at least partly on one or more of the signal processing techniques disclosed herein.

So as not to clutter up FIGS. 3a to 3d, each Figures does not include every reference numeral used to identify every elements shown therein.

Moreover, according to some embodiments of the present invention, the known type B canister in the art or another shaped canister may be configured or instrumented with speed of sound measurement capability. This would be a sampling method that would enable an air measurement within seconds rather than minutes.

CCS-0067 and 0104, FIG. 4:

The Signal Processor of Dual Frequency Techniques

FIG. 4 shows apparatus generally indicated as 10 according to some embodiments of the present invention. The apparatus 10 may include a signal processor 10a that receives signaling containing information about an acoustic signal injected into a mixture of concrete; and determines a measurement of air percentage in the mixture of concrete based at least partly on a dual frequency technique that depends on a relationship between the acoustic signal injected and the signaling received.

By way of example, and consistent with that described herein, the functionality of the signal processor 10a may be implemented using hardware, software, firmware, or a combination thereof, although the scope of the invention is not intended to be limited to any particular embodiment thereof. In a typical software implementation, the signal processor would be one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality set forth in the signal processing block 10a, such as determining the gas volume fraction of the aerated fluid based at least partly on the speed of sound measurement of the acoustic signal that travels through the aerated fluid in the container, as well as other functionality described herein without undue experimentation. The scope of the invention is not intended to be limited to any particular implementation using technology now known or later developed in the future. Moreover, the scope of the invention is intended to include the signal processor being a stand alone module, as shown, or in the combination with other circuitry for implementing another module.

It is also understood that the apparatus 10 may include one or more other modules, components, circuits, or circuitry 10b for implementing other functionality associated with the apparatus that does not form part of the underlying invention, and thus is not described in detail herein. By way of example, the one or more other modules, components, circuits, or circuitry 10b may include random access memory, read only memory, input/output circuitry and data and address buses for use in relation to implementing the signal processing functionality of the signal processor 10a, or devices or components related to mixing or pouring concrete in a ready-mix concrete truck or adding chemical additives, etc.

Figure 5A:
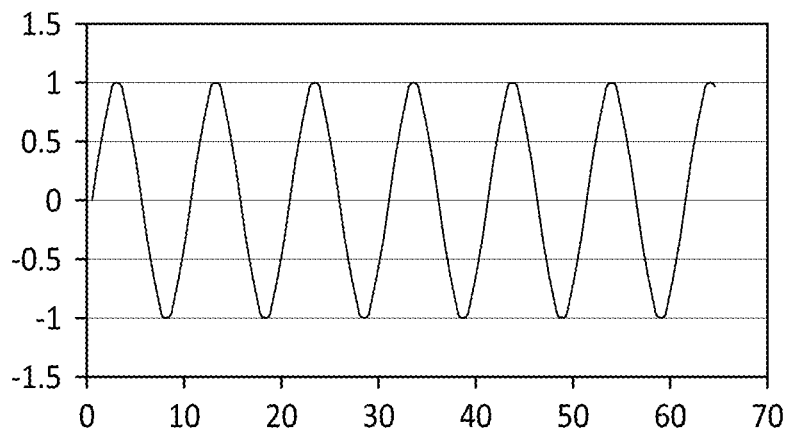
FIG. 5a is a graph of a single frequency being injected into a mixture of concrete, according to some embodiment of the present invention.
Figure 5B:
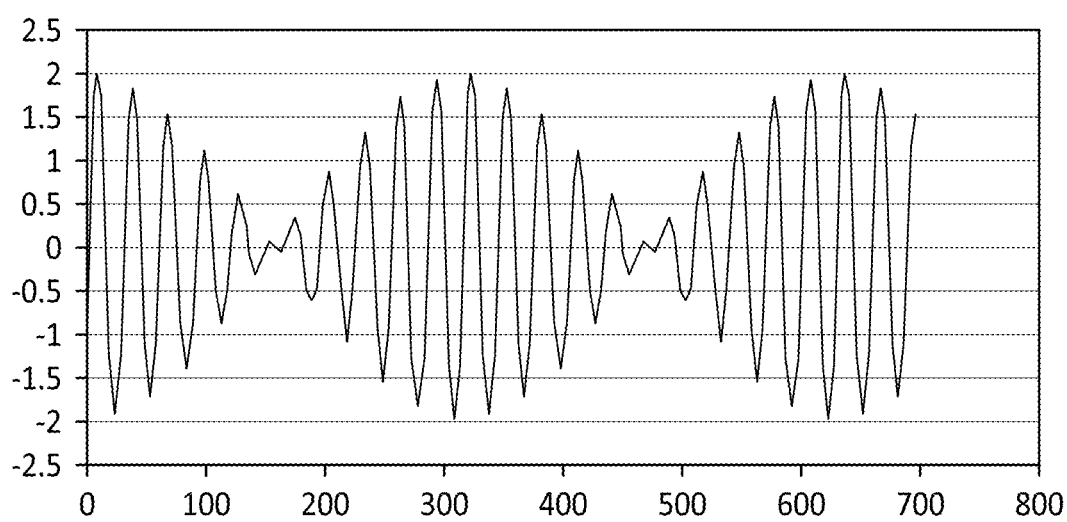
FIG. 5b is a graph of two frequencies having a frequency difference being injected into a mixture of concrete, according to some embodiment of the present invention.

Consistent with that set forth in relation to FIGS. 5a-5b, the acoustic signal injected may be a reference signal; the signaling received may be detected signaling; and the signal processor may be configured to determine the measurement of air percentage in the mixture of concrete based at least partly on mixing the reference signal with the detected signaling using a phase sensitive lock-in approach.

Figure 6A:
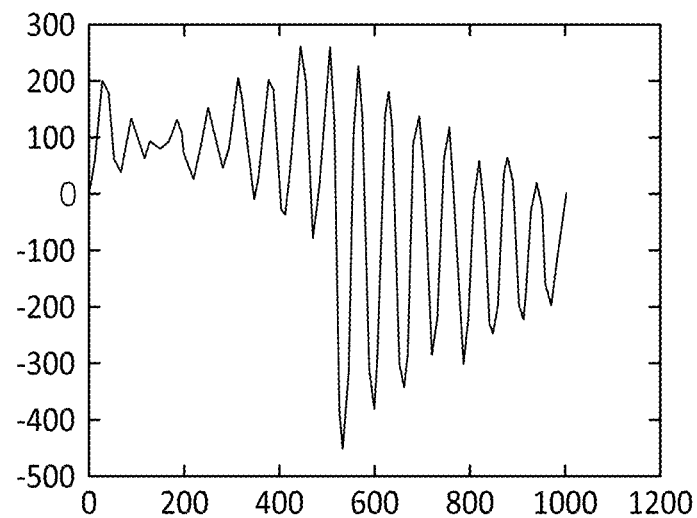
FIG. 6a is a graph of an example of a correlation function if there is strong system noise present and some of that noise coincides with a frequency of actuation.
Figure 6B:
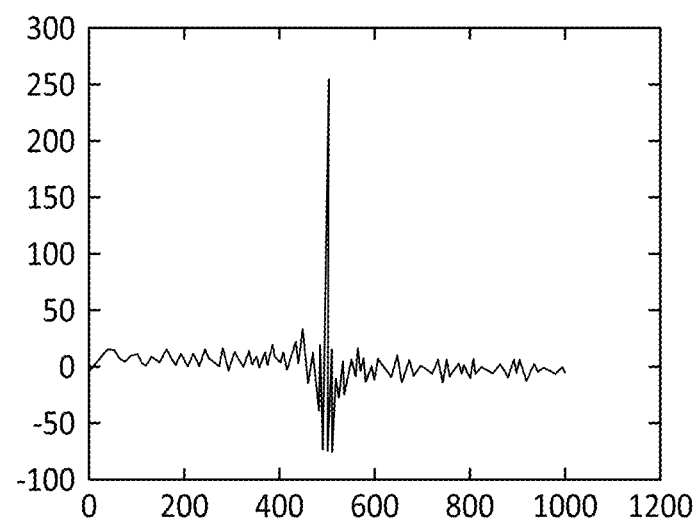
FIG. 6b is a graph of an example of a correlation function if there is strong system noise present and a sweep of the excitation frequency is provided to an actuator.
Figure 6C:
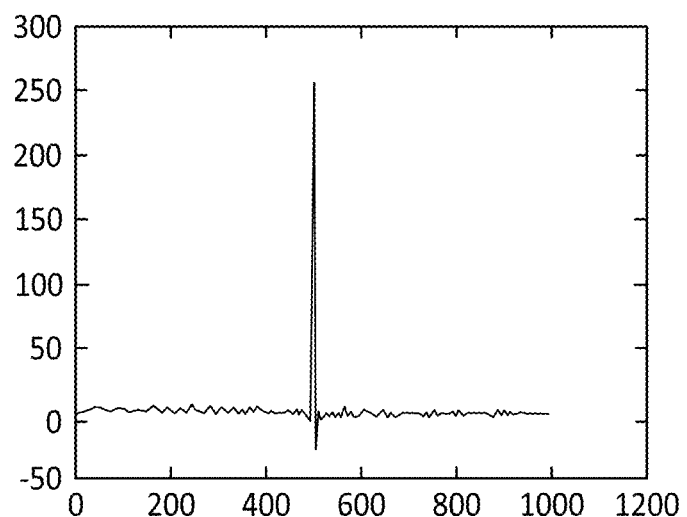
FIG. 6c is a graph of an example of a further correlation function when a PRBS encoded oscillation is used in the presence of a large noise system. provided to an actuator.

Alternatively, consistent with that set forth in relation to FIGS. 6a to 6c, the signal processor may be configured to determine the measurement of air percentage in the mixture of concrete based at least partly on correlating the acoustic signal injected and the signaling received.

CCS-0067: FIGS. 5a-5b, Phase Sensitive Dual Frequency Lock-in Measurement for Concrete Air Content with Quality Factor One approach to the measurement of air percentage in concrete is to measure the speed of sound (SOS) in the mixture and then through the use of the Wood's equation to calculate the amount of gas present. Various acoustic speed of sound measurements used in relation to SONAR-based technology as well as other sound receiving technology are set forth below with numerous patents disclosing this technology. This measurement of air percentage in concrete can be very difficult in materials like concrete where acoustic waves will quickly die out in strength due to the material's constituents along with other factors. This can be overcome by injecting a strong acoustic signal into the mixture at one point and then timing the signal propagation through a representative section of the material. However, this approach requires significant amounts of energy to produce a large compression wave in the concrete.

According to some embodiments of the present invention, a variation of this approach may be implemented that would require a modest acoustic signal to be injected but a very sensitive detection technique that can pull the injected signal out of the other acoustic "noise" that is present in the system. One detection technique that is well suited for this is a phase sensitive lock-in approach.

In a lock-in approach, a reference signal may be injected into the mixture and that same signal may be mixed with a resultant detected signal from the mixture. After a low pass filter is used to get the DC component of the result, a value may be obtained that is proportional to the amplitude and phase of the detected signal at the reference frequency. If the same calculation is made with the reference shifted by 90 deg, the phase and amplitude components can be separately determined. If one takes $\Theta$ref as the reference phase, $\Theta$det as the detected phase, Adet as the detected signal amplitude at the frequency of interest, then the signal amplitude and the signal phase difference may be determined using the following set of equations:

$\Theta = \Theta\text{det} - \Theta\text{ref}$, $X \sim \text{Adet} \cos(\Theta)$, $Y \sim \text{Adet} \cos(\Theta + 90 \text{ deg}) = \text{Adet} \sin(\Theta)$, Signal amplitude $= \text{Adet} = (X^2 * Y^2)^{1/2}$, and Signal phase difference $= \Theta = \tan^{-1}(Y/X)$.

The signal phase difference calculated along with the frequency can then be used to determine the time of propagation of the signal in the material and then the SOS.

Ambiguity in the Detected Acoustic Signal

However, an ambiguity exists once the detected signal has gone though a propagation time equal to 2*pi of the injected signal (or any multiple). This can be somewhat prevented by assuring that the frequency used for injection is low enough that the time delay can not introduce the ambiguity, however this will severely restrict the operational range of the measurement. Variations in the air content along with the attenuation characteristic of the materials may force the system to operate in a region where the ambiguity will exist. This can be prevented by injecting two slightly different frequencies into the material and then detecting each to determine the relative phase between the two injected signals, e.g., using the acoustic probe shown in FIGS. 1a to 1e that include two dynamic transducers shown in FIG. 1e. An ambiguity can still exist but it will be a function of the difference of the two injected signals rather than just the single injected frequency. This can be seen through the illustrations in FIGS. 5a and 5b. In FIG. 5a, the period of the single frequency is seen to be about 10 counts, this is the "distance" that can be measured with this system without ambiguity. In FIG. 5b, where there are 2 signals at a 10% frequency difference, now the overriding "beat" frequency determines the point at which the distance becomes ambiguous. This can be seen at about 325 counts, a very large extension of the range of the system.

An additional issue with a system such as this which calculates a SOS is the reliability of the calculation. The lock-in scheme above will always give a number for the phase delay and therefore the SOS but an indication or quality factor is needed to be able to gauge the reliability of that calculation. Since from the phase calculation the amplitude of the signal may also be obtained, this can be used for calculation of a quality metric. If one takes the amplitude of the signal at the injected frequency and compares that to several amplitudes of signals around that frequency, then one can get an indication of how the signal of interest is, or relates, to the surrounding "noise". If one takes the amplitude of the signal of interest at Asig and also take a sample of four other signals spaced adjacent to the original of A0, A1, A2 and A3, then one can average the four comparison signals and consider this the adjacent noise Anoise=(A0+A1+A2+A3)/4. A difference over sum normalization will give one a quality signal, Q, that varies between −1 to 1. With 1 representing a good quality, a 0 indicating same signal strength at frequency of interest as other frequencies and a −1 as a very weak signal of interest.

Q=(Asig−Anoise)/(Asig+Anoise).

CCS-104: FIGS. 6a-6c, Additional Concrete and Free Space Acoustic Measurement Techniques to Improve Signal range and Signal to Noise The present invention, according to some embodiments, also provides further techniques that builds upon the aforementioned disclosure describing the dual frequency method for extending the unambiguous range as well as the sensitivity of the concrete (free-space acoustics) signal detection. As mentioned, several techniques in addition to the lock-in approach that can be utilized for increasing the sensitivity and accuracy of the speed of sound detection beyond the current single wave correlation techniques.

If one takes a look at the basic technique, a single frequency acoustic wave is introduced into the mixture to be measured by way of an actuator. A detector is situated a known distance away and it will detect the introduced acoustic wave along with all the background acoustic noise in the system. In many situations the background acoustic noise can be much larger than the actuated signal making detection very difficult. However, by correlating the detected signal with the actuated signal any phase delay due to the transit time of the acoustic wave in the material can be determined and the subsequent speed of sound can be calculated. Using the correlation helps to detect only the signal of interest and works well provided that the system noise is not too overwhelmingly strong and does not have significant frequency content at the actuation frequency. FIG. 6a shows what the correlation function could look like if there is strong system noise present and some of that noise coincides with the frequency of the actuation.

One way to mitigate the distortion and errors associated with the system noise is to utilize several frequencies in the excitation. The dual frequency lock-in technique provided benefits related to dual frequency excitation, but this concept can be extended even further to the use of a continuum of frequencies. A simple sweep of the excitation frequency fed to the actuator can greatly increase the sensitivity of the correlation process by reducing the effects of the system noise and specifically reduce the degradation caused by system acoustic tones that may be present. Such a sweep can be described by:

$$Y(i)=A \sin(a\ i^2/2 + b\ i).$$

The same correlation processing can be utilized with the frequency sweep, FIG. 6b shows a correlation function obtained with strong system noise present.

Additional techniques such as encoded pulsing can be used to alternatively enhance the signal-to-noise of the detected acoustic signal. One such encoding is through the use of a pseudo-random sequence (PRBS). A PRBS is defined as a sequence of N bits where the autocorrelation of the sequence gives a number proportional to the number of on bits times the sequence length when there is 0 misalignment and a low number proportional to only the number of on bits when misaligned. This property makes it particularly suitable for use when a correlation is used to detect a low level signal. Due to the random nature of the signal encoding the probability that system acoustic noise will mimic the encoded signal is practically nil and a very strong correlation will be seen. FIG. 6c shows the further improved correlation function when a PRBS encoded oscillation is used in the presence of large system noise.

As can be seen with the encoded techniques a very good signal-to-noise can be achieved.

In the case of free-space acoustic measurements, the PRBS excitation can be created in a variety of ways such as turning on and off the excitation acoustic wave according to the PRBS sequence, or by frequency modulating the acoustic signal by the PRBS sequence. Other types of frequency encoding can be utilized such as m-sequence codes or frequency shift keying approaches.

The SONAR-based technology

The new techniques for impact and coherent noise sources for acoustic speed of sound measurements, including such acoustic speed of sound measurements used in relation to SONAR-based technology as well as other sound receiving technology as shown and described herein. By way of example, the SONAR-based entrained air meter may take the form of SONAR-based meter and metering technology disclosed, e.g., in whole or in part, in U.S. Pat. Nos. 7,165,464; 7,134,320; 7,363,800; 7,367,240; and 7,343,820, all of which are incorporated by reference in their entirety.

A. Introduction

The known SONAR-based technology includes a gas volume fraction meter (known in the industry as a GVF-100 meter) that directly measures the low-frequency sonic speed (SOS) of the liquid or slurry flowing through a pipe. By way of example, the SONAR-based entrained air meter may take the form of SONAR-based meter and metering technology disclosed, e.g., in whole or in part, in U.S. Pat. Nos. 7,165,464; 7,134,320; 7,363,800; 7,367,240; and 7,343,820, all of which are incorporated by reference in their entirety. Using the Wood's equation, the volume percent of any gas bubbles or the gas void fraction (GVF) is determined from the measured SOS. The Wood's equation requires several other inputs in addition to the measured SOS of liquid/gas mixture. One of the additional inputs in particular, the static pressure of the liquid/gas mixture, can be very important for an accurate calculation of the GVF. To a first order, if the static pressure used for the GVF calculation differs from the actual static pressure of the liquid/gas mixture, then the calculated GVF may typically differ from the actual GVF by 1% as well. For example:

Static Pressure used for GVF calculation=20 psia
Calculated GVF=2%
Actual Static Pressure=22 psia
Static pressure error=22/20−1=0.1=10%
Actual GVF=2% ×(1+0.1)=2.2%(10% error)

In many cases, the static pressure of the liquid/gas mixture is available through existing process plant instrumentation. In this case, the measured static pressure can be input directly to the GVF calculation through, e.g., an analog 4-20 mA input in the SONAR-based gas volume fraction transmitter (e.g. GVF-100 meter). Alternatively, a correction to the calculated GVF can be made in the customer DCS for any variation from the fixed pressure that was used to originally calculate the GVF.

In other cases, a static pressure transmitter can be added to the process plant specifically to measure the static pressure used for the GVF calculation. The measured pressure can either be input to the SONAR-based gas volume fraction transmitter (e.g., GVF-1200) or correction made in the DCS as described above. Occasionally, a the SONAR-based gas volume fraction meter (e.g., GVF-100) may be installed at a location in the process that does not already have a static pressure gauge installed and it is impractical to add one. This could be a location where there is no existing penetration of the pipe to sense the pressure and it would be difficult or expensive to add one. In the case, where a traditional pressure gauge is not available and it is desirable to have a static pressure measurement the following description of a non-intrusive (clamp on) static pressure measurement could be used.

B. Description

For example, according to some embodiments of the present invention, a non-intrusive static pressure measurement may be sensed using traditional strain gauges integrated into the sensor band of the SONAR-based gas volume fraction sensing technology (e.g. the known GVF-100 meter). As the static pressure inside the pipe changes, the static strain on the outside of the pipe also changes. Using a thin-wall assumption for simplicity (t/R<10, where t is the wall thickness and R is the radius) the tangential strain due to internal static pressure is:

$$\varepsilon = \frac{pR}{Et},$$

where ε is the tangential strain (inch/inch), R is the radius (inch), E is the modulus of elasticity (lb/in2) and t is the wall thickness (inch). The radius, wall thickness and modulus is generally known, or at least constant and so if the tangential strain is measured the internal static pressure can be determined.

By way of example, according to one embodiment of the present invention, four strain gauges could be arranged on the sensor band of the SONAR-based gas volume fraction sensing technology (e.g. the known GVF-100 meter) in a Wheatstone bridge configuration to maximize strain sensitivity and minimize temperature effects. In this case, the sensitivity assuming a strain gauge factor of 2, the sensitivity is approximately 13 µV/µε, where V is volts. Assuming a 4-inch schedule 40 carbon steel pipe, a one psi change in pressure would cause a 4 µV change in Wheatstone bridge output. This sensitivity would increase for larger diameter pipes which generally have a smaller t/R.

The integrated pressure gauge could be calibrated in-situ for best accuracy, but it may be sufficient to normalize the pressure output to a certain know state then use the tangential strain formula above with know pipe parameters to calculate the pressure from the measured strain.

The SONAR-based entrained air meter and metering technology are known in the art and may take the form of a SONAR-based meter disclosed, e.g., in whole or in part in U.S. Pat. Nos. 7,165,464; 7,134,320; 7,363,800; 7,367,240; and 7,343,820, all of which are incorporated by reference in their entirety. The SONAR-based entrained air meter and metering technology is capable of providing a variety of information, including the pure phase density and pure phase liquid sound speed is known, such that the GVF can be determined by measuring the speed of sound and then applying the Woods Equation.

Determining the GVF by measuring the speed of sound can provide fast an accurate data. Also the SOS measurement system can be very flexible and can easily be configured to work with different concrete containers and sample particular volumes.

Consistent with that described above, the SONAR-based entrained air meter and metering technology are known in the art and may take the form of a SONAR-based meter disclosed, e.g., in whole or in part in U.S. Pat. Nos. 7,165, 464; 7,134,320; 7,363,800; 7,367,240; and 7,343,820.

Other Known Technology

The acoustic transmitter, the acoustic receiver or receiver probe and/or transponders are devices that are known in the art, and the scope of the invention is not intended to be limited to any particular type or kind either now known or later developed in the future.

The CIP Subject Matter

This application also includes further embodiments disclosed in relation to FIGS. 7 through 11, as follows:

712-2.455 (CCS-0194):AIRTRAC™ COMMUNICATIONS METHODS AND CLOUD DATA SERVICE

To provide real time concrete air measurements, the AIRtrac™ sensor 100 is located on the rotating drum of concrete trucks. A variety of communication methods can be used to transfer the measurements from the sensor to the truck driver and also the control center or batch plant.

Several Communications Methods

The system 20 may include, or take the form of, a ready-mix truck 24 (FIG. 11) having the rotating container or drum 21 (FIG. 7) with a mechanical slip-ring 22*a* installed thereon to permit electrical connections 24*a* to provide the acoustic sensor signaling from the rotating container or drum for further processing. The ready-mix truck 24 may also include an electrical system 24*b* (FIG. 11) coupled to the electrical connections 24*a*.

By way of example, and according to some embodiments, the present invention may take the form of a system 20 shown in FIG. 11 having the sensor 100 in combination with a communications transmitter 22, where the communications transmitter 12 includes one or more of the following:

Slip-ring. A mechanical slip-ring could be installed on the truck to permit electrical connections. In this case the sensor digital communications could be tied into the trucks electrical system to take advantage of the truck telemetry system.

IR: Infrared communications could be used to send the measurements from the sensor to a receiver module located on the chassis of the truck. Whenever the drum rotates to point the sensor at the receiver data communications can occur.

This system has the advantage that for a wireless system it requires very little power, less than an RF based solution.

RF: Various RF protocols could be used to communicate between the sensor and a receiver located on the chassis of the truck, this includes Wi-Fi, industrial wireless such as 802.15.4 and Bluetooth. This communication method has the advantage that it does not require a line-of-sight between transmitter and receiver to communicate.

Cellular and satellite: Cellular or satellite modems could be incorporated into the AIRtrac™ system to communicate the measurements. This method is has a key advantage as it does not require a tie into the truck and the truck's communications system. The systems will vary between end customers and even within customers sites resulting in different communications protocol, which would require the sensor to have incorporated all the different protocols. However, this method can be much more universal, as the data can be transmitted to databases on the internet and from there served out to the customers systems. If desired the customers telemetry system can then transmit any data to the individual trucks.

712-2.456 (CCS-0195): AIRTRAC™ POWER SAVINGS METHODS

To provide real time concrete air measurements the AIRtrac™ sensor is located on the rotating drum of concrete trucks. A variety of methods can be utilized to provide power to the device however the majority of which make use of batteries and no permanent power connection. As a result it is very important to efficiently use the battery power to assure as long a measurement period as possible. In addition to the overall electrical and mechanical design, some intelligence can be used to partially turn off the device when a measurement is not needed or cannot be obtained and only power it when necessary. This application details several of these power savings methods.

For many of these methods listed here there are basic measurements required to detect when to activate the full air measurement, therefore a small amount of power is required for these measurements but the rest of the system can be put into sleep mode. Since the majority of the power is consumed by the actual air measurement system, very significant power savings can be obtained.

By way of example, and according to some embodiments, the present invention may take the form of a system 30 shown in FIG. 12 having the sensor 100 in combination with a power system 32, where the power system 32 includes one or more of the following:

Several power savings modes are as follows:
1. Wetted sensor detection. This power savings mode looks to determine when the sensor is in contact with the concrete and will tell the system to sleep if not. Conditions when the system should be put to sleep include when the sensor it at the top of the drum rotation or if the drum is empty. There are several methods that can be used to determine a wetted sensor. A dedicated sensor such as a wetness sensor or a load sensor can be implemented. Alternatively the pressure sensor that is used in the air measurement can be queried to determine when pressure is applied to the sensor by the concrete.
2. Rotation angle based. The use of a rotation sensor can be used to determine when a measurement should be taken or when the system can be put in sleep mode. As an example, when the sensor is at the bottom of the drum rotation the sensor should be in the concrete and a measurement can be taken. At all other rotational positions the system could be put in sleep mode. If several measurements per rotation are desired for improved accuracy then an active rotation angle range can be determined. A range like +/−10 degrees around the bottom could be used to activate the system and take measurements.
3. Rotation speed. The rotation sensor can also be used to determine the rotation speed of the drum and used to put the system to sleep. If the drum is not rotating then the drum might be empty or the concrete is stagnating and the system could be put to sleep. Or, if the drum is rotating too fast for an accurate measurement the system could also be put to sleep.

Additionally if measurements are not taken during discharge then the system could be put to sleep depending on drum rotation direction. There may also be a number of different sleep modes that can deactivate different parts of the system to further optimize the power usage. An example of this could be selective use of the radio that is used to communicate the system readings.

The radio could only be activated once per rotation to send readings otherwise it is disabled, or only activated when a good measurement is obtained and at the customers desired frequency.

Additionally other disclosures detail conditions under which an accurate air measurement cannot be obtained. These conditions are also times when the system could be put in sleep mode to conserve power.

712-2.457 (CCS-0196): AIRTRAC™ POWERING METHODS

The AIRtrac™ sensor 100 must be located on the rotating drum of concrete trucks, therefore getting power to the device can be a challenge. This application details several methods that can be used to provide power.

Slip-ring: A mechanical slip-ring could be installed on the truck to permit electrical connections. Although it may be tough to have a robust slip-ring that will consistently maintain a connection this solution eliminates many problems with limited power available to the AIRtrac™ sensor.

Batteries: Batteries can easily power the sensor however they present a set of challenges to optimize the usability of the system. The batteries will have to be easy to change out and the system must be designed to last for an acceptable amount of time on a single battery charge.

Solar: Solar panels can be used to power the sensor, along with batteries to serve as a backup power source. The solar panels will serve to keep the batteries changed and so present a stand-alone system that will not require attention from the customer. Limitations include the need for batteries that will only hold a certain amount of backup power, the relatively small amount of power solar cells can provide, and the cells must see sunlight for power.

Induction power: One method to wirelessly transfer power is by using induction. However, for this method to be efficient the induction transmitter must be in close proximity to the receiver. On the AIRtrac™ system this could be achieved by placing a receiver pad on the drum in a place where the drum rotates closely to the supporting frame, where the transmitter could be located. A single induction receiver pad could be used at a spot on the drum or a number of them to assure that enough power could be transferred. A battery would also be used as power storage.

Mechanical: A variety of mechanical means could be used to generate power for the sensor. Since the rotating drum possess a lot of inherent energy while it is rotating some of the motion could be harnessed. One method would be through a weight or pendulum that is allowed to move with the rotation. The weight could be coupled to a small generator to produce power. A variety of other methods could also be used.

712-2.458 (CCS-0197): CONCRETE AIR CONTENT SIGNAL CONDITIONING

It is well known that the amount of air in concrete is an important parameter. This applies both to pre-cast applications and also to redi-mix truck based applications. In Redi-mix applications the air content can be particularly hard to predict since there can be a large variety of conditions that the concrete will see before it is poured. These include: the initial truck mixing stages, the variable length trips to the job site, possible long wait times once at a job site and then the final conditioning mixing right before pour. As a result a real-time air measurements system, such as the AIRtrac™ sensor, that give air readings continuously are very important to concrete manufacturers to assure that they deliver a quality concrete. However providing accurate air measurements is a challenge due to the variety of conditions that the concrete sees. This disclosure discusses various ways of conditioning the air content reading to assure an accurate air reading.

Figure 7:
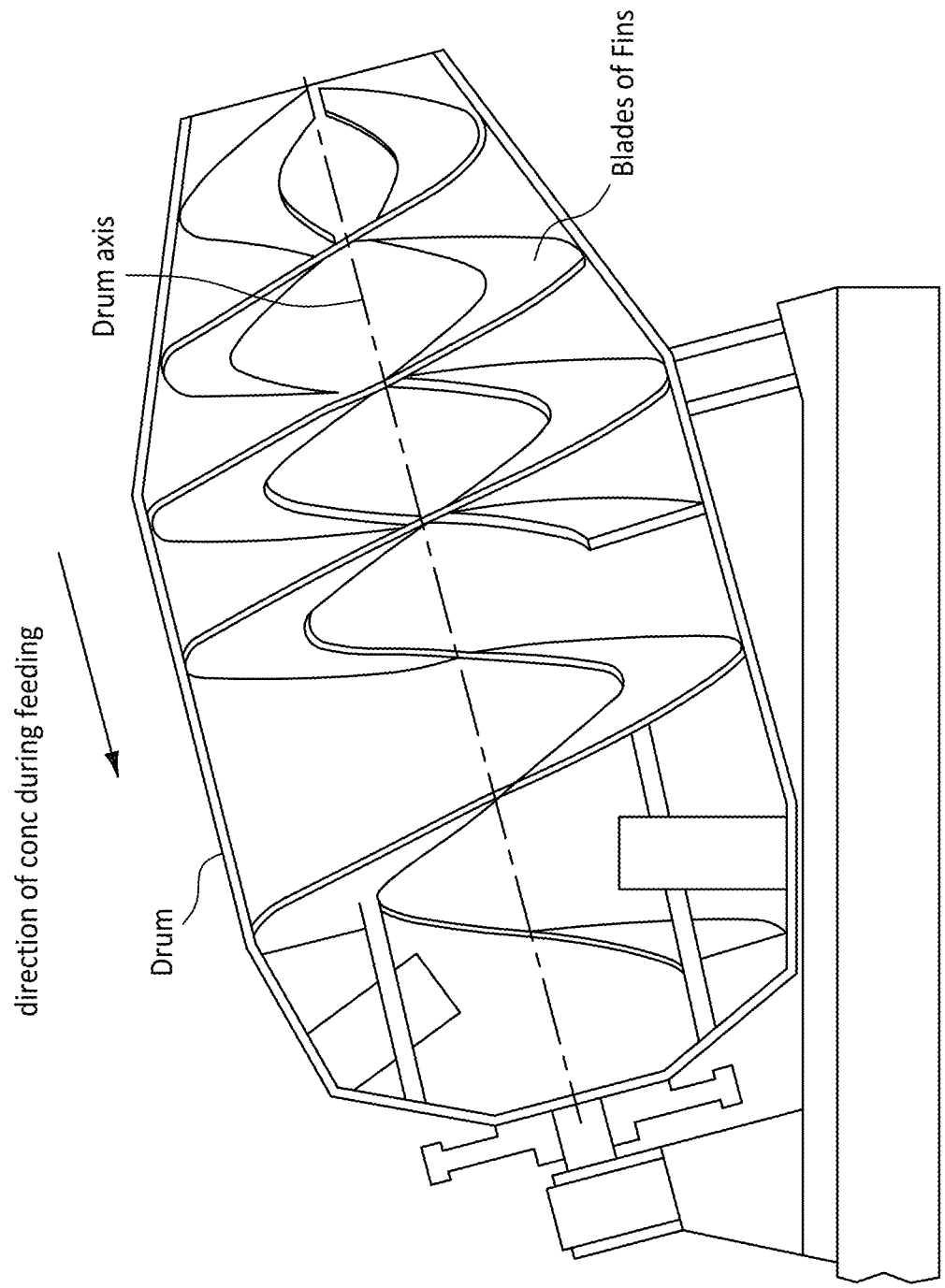
FIG. 7 is a diagram of a container or drum rotating on a drum axis having blades or fins for mixing a slurry, such as concrete, contained therein.

A typical cycle for concrete consists of: the pouring of the constituents into the concrete truck, initial mixing of the concrete, the slow mixing on the way to and at a job site, conditioning mix, then full or partial pour followed by additional mixing and pouring until the truck is empty. A typical concrete truck drum 21 is shown in FIG. 7. One of the key components are the vanes that are inside the drum that help to assure an even mixing and also aid in the charging and discharging of the concrete. The vanes can also serve to make a very chaotic environment in the drum that is not conducive to a reliable reading, so certain conditions must be met and maintained under which a reliable reading can be obtained.

Listed below are various conditions that can occur in the drum and steps that should be taken to assure that a good reading of air is obtained:

Initial Addition of Ingredients into Drum

During this time the concrete is not homogeneous and so an air reading should not be supplied. Metrics such as acoustic pressure levels will vary greatly and should be used to prevent a measurement from being displayed.

Fast rotation initial mixing of concrete: During all times when the drum is in fast rotation the conditions within the drum are very chaotic and will prevent a high quality air measurement to be made. In addition, the fast rotation of the vanes may tend to artificially aerate the concrete giving a false air reading. An air reading should not be given, the rotation speed can be used to gate the measurement.

Slow rotation on way to job site: This condition is ideal for an air measurement, the concrete is stable and homogeneous.

Fast rotation after addition of materials: After materials are added such as water to air control chemicals the concrete is not homogeneous and the fast rotation causes errors as described above. Air measurements should not be taken.

Discharge of concrete: During discharge the vanes serve to push the concrete out of the drum, therefore it may be difficult to get a fully submerged air sensor. Air readings should not be taken or taken with care. The rotation direction of the drum can be used as a gate.

Stagnation: If the concrete sits stationary for too long a good air reading may not be able to be made depending on the location of the air sensor, so air readings should not be given if the drum sits still for too long. The rotation rate can be used as a gate for measurement.

Consolidation: Consolidation occurs after a fast drum rotation or a concrete discharge and lasts for a few drum rotations while the concrete is being positioned in the drum and is becoming homogeneous. During this time an air measurement should not be made until the concrete is settled and homogeneous. The number of drum rotations after a discharge or fast spin can be used to gate the air measurement.

Figure 8:
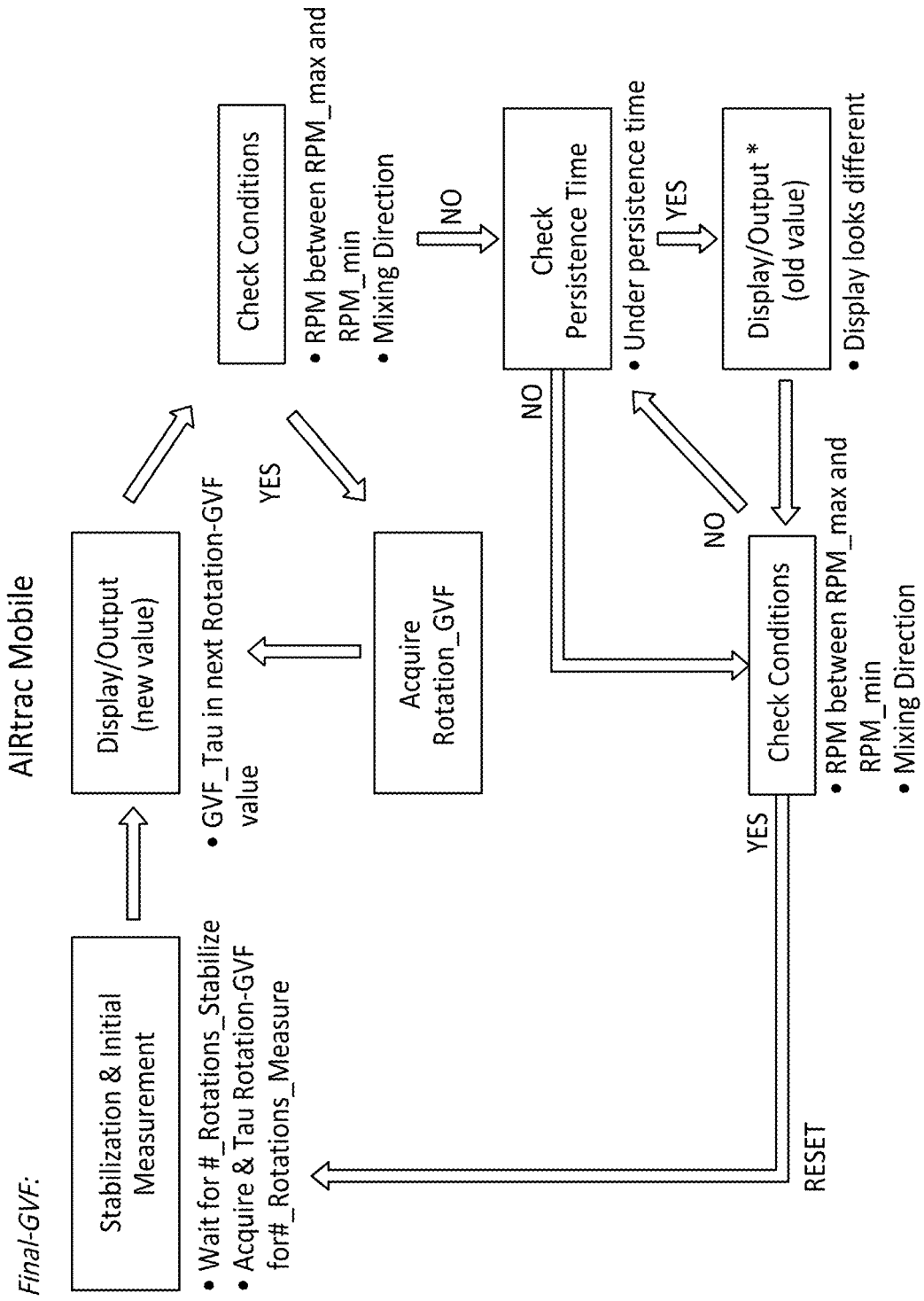
FIG. 8 is a flowchart of a process to gate the air reading depending on conditions of the container or drum, e.g., including steps for stabilization and initial measurements; display/output of a new value; check conditions; if yes, then acquire a rotation_GVF; if no, then check persistence time; if yes, then display/output the old value; if no, then check conditions; if yes, then check persistence time; and if no, then reset and repeat stabilization and initial measurements.

FIG. 8 shows a flow chart of the process to gate the air reading depending on the conditions of the drum. Since the above criteria details only certain conditions it would be desirable to convey this information to the concrete truck driver so he can set the correct conditions to obtain a good air measurement.

In addition to the above conditions for determining when an air measurement should be given there are other quality metrics in place to assure a quality measurement is given. Some of these metrics are as follows:

Pressure threshold on the received acoustics,
Acoustic source threshold minimum levels, and
Cross-correlation minimum.

CCS-0211: AIRtrac™ Mobile Condition Monitoring and Alerting

The AIRtrac™ mobile device provides several key pieces of information about concrete and the conditions surrounding the concrete. Fundamentally, it measures the percentage of air in the mix, the temperature and gives drum rotation speed and position. These parameters can give insight into many different characteristics of the concrete and how the concrete is being prepared, both of which are important to concrete manufacturers. If the AIRtrac™ meter is coupled to a telematics system then this data can be sent back to the central batch plant or a quality control department allowing for remote monitoring of these parameters by both manual observation as well as automated monitoring.

Manual observation can reveal the following:
1. Proper drum sequencing and control by the truck drivers as they travel to the customer's site as well as during the concrete pour. As an example: often a truck driver will spin-up the drum once on site before the actual concrete pour, however this can lead to an increase in the %air in the concrete that is not desirable. Alternatively there may be a pre-determined drum speed and rotation count that is standard before a pour to ensure concrete homogeneity. Both of these examples could be monitored and recorded by the customer using the AIRtrac™ sensor's measurements of %air and drum rotation.
2. The addition of water to concrete needs to be strictly monitored and controlled to ensure that the end concrete has the proper characteristics once set. Often the temperature of the concrete is altered through the addition of water and so can be observed remotely by shifts in measured concrete temperature.
3. Trending of the %air as the truck travels from the plant to the customer's site. Often when a specific amount of air is specified in a batch of concrete the plant will adjust for expected air decrease as the truck travels to the job site, as naturally happens as the concrete is transported. However a lot of different parameters can affect this decrease including the base material such as aggregate wetness or overall outside temperature. A real time indication of the %air can reveal any unexpected trends and allow the batch plant to adjust its initial mixture to compensate.
4. Identification of unexpected movements in the data. This could range over a variety of conditions including: too high or too low RPM indicating a truck driver not working within specifications or a drum that has stopped rotating for an extended period and runs the risk of concrete starting to set too early. Unexpected jumps in %air possibly indicating the addition of chemicals to change air content or the addition of water. Sudden changes in concrete temperature also indicating an addition of water or possibly the chemical reaction in concrete progressing too quickly and therefore causing the concrete to set sooner than designed.

The above mentioned conditions and others can be seen and manually monitored by the concrete manufacturer however, if there are a considerable number of trucks in the fleet it would not be possible for each truck to be continuously monitored. In this case a series of automatic notifications or alerts can be used to help direct attention to a truck that requires analysis. This notification can be triggered by a wide variety of conditions including:
1. Simple thresholding. Setting up threshold for each of the key parameters to notify when a value goes too high or low
2. Trend analysis. If some of the monitored parameters are trending above a certain rate. This can be useful to identify a problem before it actually gets to a threshold level and can be corrected before it actually goes too far.
3. Sudden changes in parameters outside of typical variations. This can indicate abnormal behavior of the equipment in addition to changes in the concrete.
4. Pattern matching. This looks for the absence or occurrence of specific patterns in the monitored parameters. As an example: if the truck driver is instructed to perform a specific sequence of drum rotation steps (such as certain number of rotations at a specific speed) before discharging concrete this can assure it is performed correctly.

These alerts and notifications can be generated in a variety of locations along the data path. This includes in the device itself, an intermediary cloud storage and analysis location, or the customers own control software. In addition, there are a variety of ways that the notifications can be delivered, including email, texting, program or app pop-up notification among others.

CCS-0212: Precise Concrete Temperature Measurement Inside a Rotating Drum

The AIRtrac™ Mobile sensor system provides a variety of measurements that are useful to concrete manufacturers, one of which is the temperature of the concrete while inside a concrete truck drum. Maintaining the temperature of the concrete within a specific range is crucial for the integrity of the poured concrete and its final properties when set. In addition since concrete undergoes an exothermic hydration reaction as it cures the temperature of the concrete will not be stable with time so being able to monitor the temperature in real time is a great advantage for the concrete manufacturer.

Clearly the best location for a measurement of the concrete temperature in a rotating concrete drum is on the inside of the drum. However, since a concrete drum is never completely full of concrete the gauge sometimes be submerged in concrete and other times will be out of the concrete in the air at the top of the drum. As a result a continuous measurement of temperature gives data that looks like that shown in FIG. 9.

Figure 9:
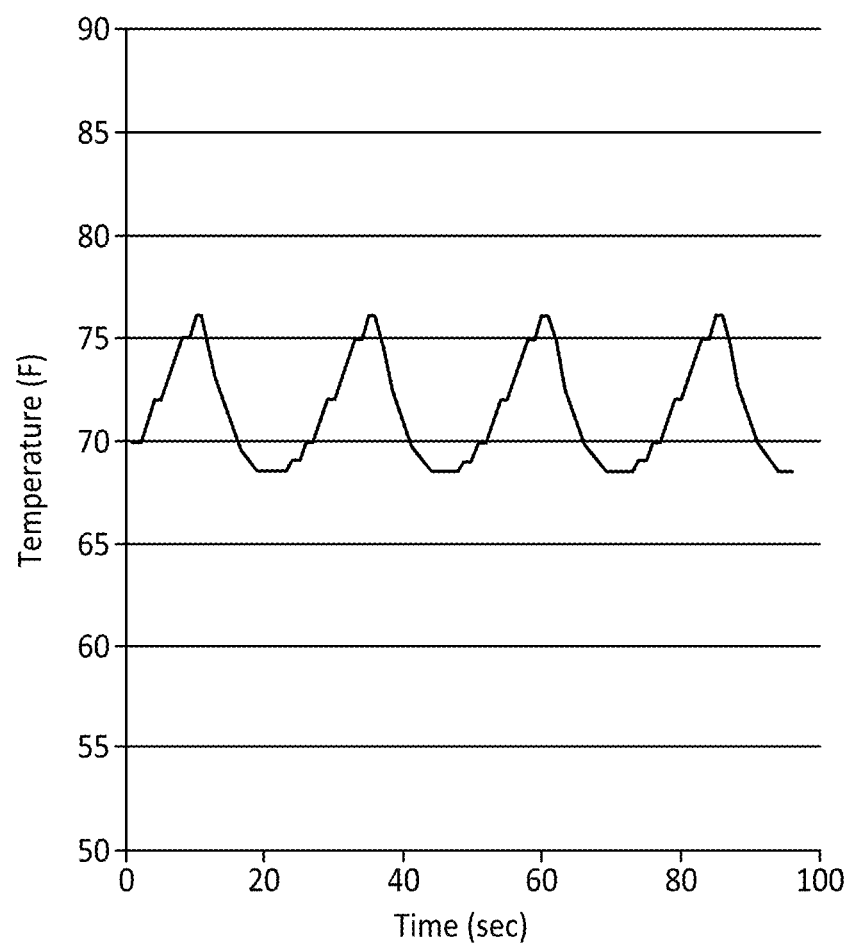
FIG. 9 is a graph of temperature (F) versus time (seconds).

In the case shown in FIG. 9, the concrete temperature is actually at about 68 F but as the temperature gauge rotated out of the concrete it measures an air temperature of about 76° F. This rotation produces an oscillation on the temperature measurement as shown. In addition a simple averaging of the temperature over all cycles will also give an incorrect measurement since the air is biasing the average.

In order to provide the most precise temperature of the concrete the AIRtrac™ system uses a series of conditions to assure accurate readings. The two primary conditions are:
1. The drum must be in motion
2. The sensor must be submerged in the concrete First, the concrete drum must be in motion to assure that the concrete is mixed and a homogenous temperature is present in the concrete, otherwise the temperature gauge might just measure a local temperature that is not representative of the whole batch. This is particularly true if the drum has been motionless for a long period of time. Second, the AIRtrac™ device can tell though the use of it other sensors, including the local pressure sensor, when the device is submerged in the concrete and then can report an accurate temperature reading. FIG. 10 shows the AIRtrac™ sensor relative to the concrete in the drum.

In summary, the current AIRtrac™ device reports true concrete temperature. The temperature sensor on the device runs continuously however the actual reporting of the concrete temperature is gated by requirements that the drum is in rotation and the sensor is submerged in concrete.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A ready-mix truck having a system for making a full air measurement to sense a characteristic of a slurry contained in a rotating container or drum, comprising:
an acoustic sensor arranged in the rotating container or drum having the slurry contained therein, including concrete, so that the acoustic sensor enters and exits the slurry as the rotating container or drum rotates, configured to inject an acoustic sensor signal into the slurry, sense an acoustic signal containing information about the characteristic of the slurry, provide acoustic sensor signaling containing information about the acoustic signal sensed, and also configured to receive a power control signal and activate to make the full air measurement to sense the characteristic of the slurry, and then de-activate after making the full air measurement;
a communication transmitter arranged on the rotating container or drum, and configured to receive the acoustic sensor signaling provided from the acoustic sensor, and provide the acoustic sensor signaling received for further processing; and
a power system arranged on the rotating container or drum, and configured to receive a power signal, and provide the power control signal to the acoustic sensor to activate and power the acoustic sensor to make the full air measurement to sense the characteristic of the slurry, and de-activate the acoustic sensor and remove power after making the full air measurement, based upon a relationship between the acoustic sensor and either the rotating container or drum, or the slurry being sensed, the power system configured to implement a power savings mode based upon detecting either a wetting of the acoustic sensor, or a rotational angle of the rotating container or drum, or a rotation speed of the rotating container or drum, or some combination thereof, the rotating container or drum having a maximum rotating speed to make an accurate full air measurement, and the power system configured to de-activate the acoustic sensor and remove power when the rotating container or drum is rotating above the maximum rotating speed.

2. The ready-mix truck according to claim 1, wherein the communication transmitter comprises a radio frequency (RF) transmitter;
the RF transmitter is configured to send the acoustic sensor signaling to an RF receiver module located on a chassis of a ready-mix truck; and
the RF transmitter includes Wi-Fi, industrial wireless, including 802.15.4, and Bluetooth.

3. The ready-mix truck according to claim 1, wherein the power system is configured to de-activate the acoustic sensor and remove power when the acoustic sensor is not in contract with the slurry.

4. The ready-mix truck according to claim 1, wherein the wetting of the acoustic sensor is determined by sensing a wetness, a load or a pressure on the acoustic sensor.

5. The ready-mix truck according to claim 1, wherein the power system is configured to de-activate the acoustic sensor and remove power when the rotating container or drum is not rotating.

6. The ready-mix truck according to claim 1, wherein the power system comprises a wetted detection sensor configured to determine when the acoustic sensor is in contact with the concrete and provide wetted detection sensor signaling containing information to de-activate the acoustic sensor when the wetted detection sensor determines that the acoustic sensor is not in contact with the concrete.

7. The ready-mix truck according to claim 6, wherein the wetted detection sensor is configured to determine when the acoustic sensor is at a top of a container or drum rotation or when the rotating container or drum is empty, and de-activate the acoustic sensor.

8. The ready-mix truck according to claim 6, wherein the wetted detection sensor is a dedicated sensor, including a wetness sensor, or a load sensor, or a pressure sensor that is used in the air measurement and queried to determine when pressure is applied to the welted detection sensor by the concrete.

9. The ready-mix truck according to claim 1, wherein the power system comprises a rotation sensor configured to sense the rotational angle of the rotating container or drum and provide rotation sensor signaling containing information about the rotational angle.

10. The ready-mix truck according to claim 9, wherein the power system is configured to respond to the rotation sensor signaling and provide power to the acoustic sensor when the acoustic sensor is at a bottom of the rotating container or drum in the concrete.

11. The ready-mix truck according to claim 10, wherein the power system is configured to activate the acoustic sensor when the rotation sensor detects that the rotation sensor is in a range of about +/−10 degrees around the bottom of the rotating container or drum.

12. The ready-mix truck according to claim 9, wherein the power system is configured to determine the rotation speed of the rotating container or drum and activate the acoustic sensor based upon the determined rotation speed.

* * * * *